(12) United States Patent
Sagara

(10) Patent No.: US 7,852,718 B2
(45) Date of Patent: Dec. 14, 2010

(54) COMPENSATION VALUE SETTING DEVICE AND COMPENSATION VALUE SETTING METHOD

(75) Inventor: Seiichi Sagara, Tokyo (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 12/126,638

(22) Filed: May 23, 2008

(65) Prior Publication Data
US 2008/0310263 A1 Dec. 18, 2008

(30) Foreign Application Priority Data
Jun. 15, 2007 (JP) ............................. 2007-159287

(51) Int. Cl.
*G11B 7/00* (2006.01)
(52) U.S. Cl. ............... 369/44.32; 369/44.23; 369/44.35
(58) Field of Classification Search ............. 369/44.32, 369/44.29, 44.35, 44.34, 59.21, 59.22, 44.23
See application file for complete search history.

(56) References Cited

U.S. PATENT DOCUMENTS 5,938,791 A    8/1999   Narahara

2004/0174781 A1 *   9/2004   Nishi ................. 369/44.32
2006/0114793 A1 *   6/2006   Tonami ............... 369/112.01
2007/0230295 A1 * 10/2007   Nishi ................. 369/44.32

FOREIGN PATENT DOCUMENTS

JP          10-21651           1/1998

* cited by examiner

*Primary Examiner*—Joseph H Feild
*Assistant Examiner*—Nicholas Lee
(74) *Attorney, Agent, or Firm*—Oblon, Spivak, McClelland, Maier & Neustadt, L.L.P.

(57) ABSTRACT

A compensation value setting device selects, based on the first and second index values calculated by the first and second index value calculation sections for each combination of the spherical aberration compensation value and the lens' position compensation value, one combination of the spherical aberration compensation value and the lens' position compensation value and then sets the selected combination for correcting the spherical aberration and the position of the objective lens.

6 Claims, 22 Drawing Sheets

COMPENSATION VALUE SETTING DEVICE AND COMPENSATION VALUE SETTING METHOD

CROSS REFERENCES TO RELATED APPLICATIONS

The present invention contains subject matter related to Japanese Patent Application JP2007-159287 filed in the Japanese Patent Office on Jun. 15, 2007, the entire contents of which being incorporated herein by reference.

BACKGROUND OF THE INVENTION

1. Field of the Invention

The present invention relates to a compensation value setting device and compensation value setting method, and is preferably applied to a recording and reproducing device that records and reproduces data from an optical disc, for example.

2. Description of the Related Art

In order to record and reproduce data from an optical disc, a recording and reproducing device usually uses the combination of the following methods: Partial Response Maximum Likelihood (PRML), which is one kind of partial response equalization, and maximum likelihood decoding, such as Viterbi decoding. When it adjusts sampling phase drift, track offset or the like, the recording and reproducing device writes trial recording bits, or a string of bits for recording test, on a data recording surface of an optical disc, and then reads out them from the data recording surface as analog readout signals, which are then supplied to a PRML circuit. The PRML circuit sequentially performs the processes of partial response equalization and maximum likelihood decoding to the readout signals to reproduce binary decoded data or the trial recording bits.

At this time, the recording and reproducing device synchronizes the recording sequence and the reproducing sequence, both of which are acquired by the PRML circuit. The recording and reproducing device subsequently calculates the differences of the likelihoods of the path of the reproducing sequence, which corresponds to the recording sequence whose Euclidean distance is smallest as a result of maximum likelihood decoding, and then sorts out the differences to obtain a standard deviation. Based on those differences and the standard deviation, the recoding and reproducing device adjusts sampling phase drift, track offset and the like such that the standard deviation becomes smallest (see Jpn. Pat. Laid-open Publication No. H10-21651 [Pages 1 and 2], for example).

SUMMARY OF THE INVENTION

By the way, the recording and reproducing device emits a laser beam from a laser diode of an optical pickup via an objective lens, where the laser beam is collected, toward the data recording surface of the optical disc. The objective lens situated on an actuator is designed to move in two directions: in one direction (also referred to as "approaching direction"), the objective lens moves closer to the data recording surface of the optical disc along the optical axis of the laser beam; and in the other direction (also referred to as "departing direction"), the objective lens moves away from the data recording surface.

When emitting a laser beam to the data recording surface of the optical disc, the recording and reproducing device produces a focus error signal from the reflection of the beam from the data recording surface: The focus error signal indicates a distance from the objective lens' current position to its desirable position where the objective lens can appropriately emit the beam toward the data recording surface so that the beam is appropriately focused on the data recording surface for good writing and reading of data and which direction (departing or approaching direction) the objective lens should move. In accordance with the focus error signal, the recording and reproducing device drives and controls the actuator to move the objective lens, along the optical axis of the laser beam in the approaching or departing direction, toward the desirable position.

However, there is a possibility that the focus error signal has some errors, due to errors in assembling the parts of the optical pickup (the error of alignment of the parts, for example), molding the parts and the like, thereby leading the objective lens to undesirable positions, and therefore the recording and reproducing device would not write and read data appropriately.

Accordingly, the recording and reproducing device is designed to set a lens' position compensation value (also referred to as "bias value") of a lens' position compensation signal (also referred to as "focus bias signal") to correct the position of the objective lens (also referred to as "lens' position"). When recording or reproducing data, the recording and reproducing device adds the focus bias signal to the focus error signal and drives and controls the actuator in accordance with the result of addition. In this manner, the recording and reproducing device compensates for the error of the focus error signal by using the focus bias signal to correct the lens' position, leading the objective lens to the desirable position from which the laser beam is appropriately emitted toward the data recording surface.

Since the optical pickup of the recording and reproducing device uses a spherical objective lens to collect the laser beam, it may cause spherical aberration, which is a deviation of a focal point of the beam: The focal point of the beam (or collimated light) moves close to the objective lens when the beam strikes the objective lens near its edge (or away from the optical axis), in comparison with that of the beam striking the objective lens near the optical axis. This creates a circular, expanded and imperfect image instead of producing a spot of the beam, and therefore the recording and reproducing device would not write and read data appropriately. Spherical aberration should be corrected for high-density recording CDs, especially considering the error of thickness of a cover layer of the data recording surface and a multiple layers of the data recording surface.

Accordingly, the optical pickup of the recording and reproducing device for example contains a spherical aberration correction lens on the path of the laser beam. The spherical aberration correction lens is mounted on the actuator such that it can move along the optical axis. In addition, the recording and reproducing device is designed to set a spherical aberration compensation value (also referred to as "aberration compensation value") of a spherical aberration compensation signal, which is used to correct spherical aberration related to the laser beam. When recording and reproducing data, the optical pickup of the recording and reproducing device follows the spherical aberration compensation signal and moves the spherical aberration correction lens along the optical axis toward a desirable position to correct spherical aberration related to the laser beam.

By the way, the correction of the lens' position and spherical aberration is aimed at adjusting the state of the laser beam emitted toward the data recording surface of the optical disc; they are correlated with one another. Therefore, when it starts running, the recording and reproducing device does not set the bias value of the focus bias signal and the aberration compensation value of the spherical aberration compensation signal separately; the recording and reproducing device sets them at once as a combination.

On the other hand, there is a proposal that the recording and reproducing device should set the bias value and the aberration compensation value by using an evaluation value acquired by a process of PRML, which is similar to the one described above. Such PRML processes are designed to demodulate data with low error rates by suppressing inter-symbol interference, which may occur when signals are read out from high-density optical discs.

That is, the PRML processes can correct the phase difference between symbols, which occurs due to the distorted laser beam spot enlarging in the direction of a tangent to for example the optical disc. Therefore it can demodulate data accurately. However, the PRML processes have difficulties in correcting crosstalk and the like, which occur due to the distorted laser beam spot enlarging in the radial direction of the optical disc. In this case, it may not be able to demodulate data accurately.

The following describes an evaluation value for a combination of the bias value and the aberration compensation value (such a combination of values is also referred to as "pair of compensation values), which are acquired by the PRML processes. As shown in FIG. 1, the evaluation values for all the pairs of compensation values are plotted: the aberration compensation value is plotted along a horizontal axis and the bias value along a vertical axis. The graph represents contour lines, each of which is a group of evaluation values at the same level. Those concentric contour lines extend in one direction and narrows in a direction perpendicular to that direction. It means that the evaluation values have this kind of characteristics.

In that manner, the evaluation values are expressed on a two-dimensional plane, or a two-dimensional graph (i.e. a two-dimensional coordinate plane), by plotting the pairs of compensation values (i.e. the bias values and the aberration compensation values) on the graph. In this case, those within the innermost contour line (this range is also referred to as "high evaluation value range") have relatively high evaluation values, which allow the device to record and read data accurately. The values between the second and third innermost contour lines have lower evaluation values than those within the high evaluation value range, and, the more they goes outside, the lower the evaluation values will be.

To calculate the evaluation values for the pairs of compensation values, the recording and reproducing device corrects the lens' position and the spherical aberration by using each pair of compensation values on trial basis. The recording and reproducing device then chooses the pair of compensation values of the highest evaluation value, like the one within the high evaluation value range, to correct the lens' position and the spherical aberration.

However, there may be an error in calculating the evaluation values: If the recording and reproducing device chooses a pair of compensation values HC1 or HC2, which is positioned at the edge of the high evaluation value range (HC1 at one side and HC2 at the other side in a certain direction), to correct the lens' position and the spherical aberration, the objective lens after being corrected by the recording and reproducing device could almost reach the limit of the object lens' motion range due to its bias value.

In that manner, the recording and reproducing device that has chosen the pair of compensation values HC1 or HC2 may not be able to adjust the position of the objective lens appropriately, especially when the axial run-out of the rotating optical disc is being measured. This may dramatically lower the ability of servo (i.e. the ability of focusing the laser beam on the data recording surface), and the ability of recording and reading.

Moreover, when the recording and reproducing device is writing or reading data from an optical disc, if the laser beam is not focused on the optical disc's data recording surface appropriately (i.e. out of focus) or the laser beam being focused on the data recording surface becomes circular due to the change of distance between the optical components of the optical pickup caused by changing temperatures inside the device, the axial run-out of the optical disc, or the like, the lens' position and the spherical aberration may be corrected as if by using a different pair of compensation values that is adjacent to the pair of compensation values HC1 or HC2 on the two-dimensional graph (i.e. by using a pair of compensation values outside the high evaluation value range). This may lower the ability of reading and writing. Thus, even it uses the evaluation values generated by the PRML processes, the recording and reproducing device may not be able to set an appropriate pair of compensation values for correcting the lens' position and the spherical aberration.

The present invention has been made in view of the above points and is intended to provide a compensation value setting device and compensation value setting method that can set the spherical aberration compensation value and the lens' position compensation value appropriately.

In one aspect of the present invention, a compensation value setting device, which sets a spherical aberration compensation value for correcting the spherical aberration related to a laser beam collected by an objective lens before reaching a data recording surface of an optical disc and a lens' position compensation value for correcting the position of the objective lens, includes: a changing section that sequentially changes the combination of the spherical aberration compensation value and the lens' position compensation value; a first index value calculation section that calculates, each time the combination of the spherical aberration compensation value and the lens' position compensation value is changed by the changing section and a trial process of correcting the spherical aberration and the position of the objective lens is performed, a first index value representing the evaluation of the combination of the spherical aberration compensation value and the lens' position compensation value for the trial process based on a signal acquired as a result of emitting the laser beam to the data recording surface of the optical disc via the objective lens that collects the laser beam; a second index value calculation section that calculates, each time the combination of the spherical aberration compensation value and the lens' position compensation value is changed by the changing section and a trial process of correcting the spherical aberration and the position of the objective lens is performed, a second index value representing the evaluation of the combination of the spherical aberration compensation value and the lens' position compensation value for the trial process based on data generated after a waveform equalization process for the signal; and a setting section that selects, based on the first and second index values calculated by the first and second index value calculation sections for each combination of the spherical aberration compensation value and the lens' position compensation value, one combination of the spherical aberration compensation value and the lens' position compensation value and then sets the selected combination for correcting the spherical aberration and the position of the objective lens.

In this manner, the device calculates the first and second index values, which have different characteristics, from the signal generated before the waveform equalization process and the data generated after the waveform equalization process. Based on the first and second index values, the device limits the number of the combinations from which it will select one for setting.

As described above, a compensation value setting device, which sets a spherical aberration compensation value for correcting the spherical aberration related to a laser beam collected by an objective lens before reaching a data recording surface of an optical disc and a lens' position compensation value for correcting the position of the objective lens, includes: a changing section that sequentially changes the combination of the spherical aberration compensation value and the lens' position compensation value; a first index value calculation section that calculates, each time the combination of the spherical aberration compensation value and the lens' position compensation value is changed by the changing section and a trial process of correcting the spherical aberration and the position of the objective lens is performed, a first index value representing the evaluation of the combination of the spherical aberration compensation value and the lens' position compensation value for the trial process based on a signal acquired as a result of emitting the laser beam to the data recording surface of the optical disc via the objective lens that collects the laser beam; a second index value calculation section that calculates, each time the combination of the spherical aberration compensation value and the lens' position compensation value is changed by the changing section and a trial process of correcting the spherical aberration and the position of the objective lens is performed, a second index value representing the evaluation of the combination of the spherical aberration compensation value and the lens' position compensation value for the trial process based on data generated after a waveform equalization process for the signal; and a setting section that selects, based on the first and second index values calculated by the first and second index value calculation sections for each combination of the spherical aberration compensation value and the lens' position compensation value, one combination of the spherical aberration compensation value and the lens' position compensation value and then sets the selected combination for correcting the spherical aberration and the position of the objective lens. In this manner, the device calculates the first and second index values, which have different characteristics, from the signal generated before the waveform equalization process and the data generated after the waveform equalization process. Based on the first and second index values, the device limits the number of the combinations from which it will select one for setting. Accordingly, the compensation value setting device and compensation value setting method according to an embodiment of the present invention can set the spherical aberration compensation value and the lens' position compensation value appropriately.

The nature, principle and utility of the invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

Figure 2:
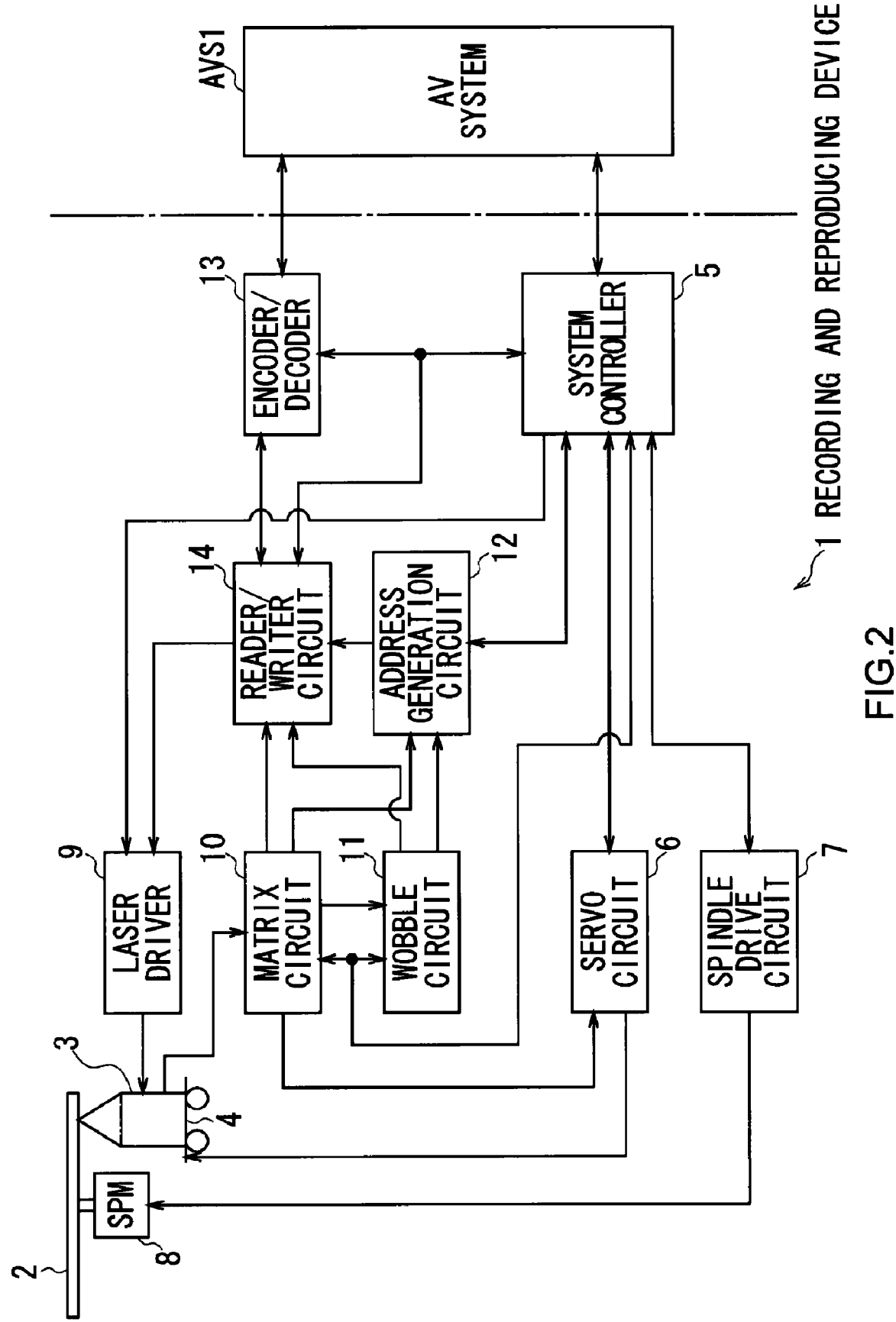
FIG. 2 is a block diagram illustrating the circuit configuration of a recording and reproducing device according to an embodiment of the present invention.

In FIG. 2, the reference numeral 1 denotes a recording and reproducing device according an embodiment of the present invention. An optical disc 2 can be inserted into the recording and reproducing device 1. The recording and reproducing device 1 includes an optical pickup 3 facing the data recording surface of the inserted optical disc 2. The optical pickup 3 is situated on a sled mechanical section 4, which allows the optical pickup 3 to move in a radial direction, or the direction of a line connecting the center of the optical disk and a point on the periphery of the optical disk (also referred to as "disc radial direction").

The recording and reproducing device 1 is for example able to record data on a phase-change optical disc 2 and is also able to reproduce data from the optical disc 2. A wobbled groove, or pre-groove, is formed on the data recording surface of the optical disc 2 such that a constant linear velocity results in a constant frequency. The groove (and a land between the grooves) is served as a track for recording data. In addition, the address information of the data recording surface, known as Address In Pre Groove (ADIP), is embedded in the wobbled groove of the optical disc 2: The address information is also referred to as "disc address information."

The recording and reproducing device 1 has a system controller 5, which is for example a micro computer. Following commands supplied from an external Audio Visual (AV) system AVS1 (such as a write or read command), the system controller 5 takes overall control of the device 1 to perform processes. The system controller 5 starts running in startup mode, when the recording and reproducing device 1 into which the optical disc 2 has been already inserted is powered on, or when the recording and reproducing device 1 is powered on and then the optical disc 2 is inserted into the recording and reproducing device 1.

After that, for example, a servo circuit 6, under the control of the system controller 5, drives the sled mechanical section 4 to move the optical pickup 3 toward the center of the optical disc 2 and place the optical pickup 3 under the innermost track of the optical disc 2. A spindle drive circuit 7, under the control of the system controller 5, drives a spindle motor 8 to rotate the optical disc 2 at constant speed. After the optical disc 2 starts rotating, a laser driver 9, under the control of the system controller 5, generates a laser control signal and supplies it to the optical pickup 3 to emit a laser beam continuously.

After receiving the laser control signal from the laser driver 9, the optical pickup 3 emits a laser beam from its laser diode continuously. The laser beam is collected by an objective lens before reaching the data recording surface of the optical disc 2. The laser beam then gets reflected on the data recording surface of the optical disc 2. The optical pickup 3 for example contains a plurality of photo detectors, which receive the laser beam reflected from the data recording surface of the optical disc 2 and then convert it into electric signals (also referred to as "photoelectric signals"), which represent the amount of light the photo detectors have received. The photoelectric signals are supplied to a matrix circuit 10.

After receiving the photoelectric signals from the optical pickup 3, the matrix circuit 10 interprets them as values of voltage. The matrix circuit 10 then uses them selectively to perform a matrix arithmetic process, an amplification process and the like. In this manner, the matrix circuit 10 produces from the photoelectric signals a focus error signal, which indicates how well the laser beam is focused on the data recording surface of the optical disc 2.

Moreover, the matrix circuit 10 produces from the photoelectric signals a tracking error signal, which indicates how well the emitted laser beam is following the track of the data recording surface of the optical disc 2. The matrix circuit 10 transmits the focus error signal and the tracking error signal to the servo circuit 6.

Meanwhile, the servo circuit 6, under the control of the system controller 5, produces a focus search signal, which is used for searching for a desirable position of the objective lens that allows the laser beam to be appropriately focused on the data recording surface of the optical disc 2, and then supplies the focus search signal to the optical pickup 3. In accordance with the focus search signal, the servo circuit 6 moves the objective lens of the optical pickup 3 along an optical axis toward the data recording surface of the optical disc 2, for example. At the same time, in accordance with the focus error signal supplied from the matrix circuit 10, the servo circuit 6 performs a focus pull-in operation such that the laser beam is being focused on the data recording surface.

After completing the focus pull-in operation, the servo circuit 6 produces a focus control signal from the focus error signal, which the matrix circuit 10 continuously supplies to the servo circuit 6, and then supplies the focus control signal to the optical pickup 3. In accordance with the focus control signal, the servo circuit 6 moves the objective lens of the optical pickup 3 along the optical axis in a direction toward the data recording surface of the optical disc 2 (this direction is also referred to as "approaching direction") or in a direction opposite to the approaching direction (this direction is also referred to as "departing direction"), such that the laser beam is focused on the data recording surface of the optical disc 2. In that manner, such a focus servo loop, which includes the servo circuit 6, the optical pickup 3 and the matrix circuit 10, is formed. Accordingly, the laser beam is focused on the data recording surface of the optical disc 2 and follows the track on it.

In addition, the servo circuit 6, under the control of the system controller 5, generates a track search signal, which is used for adjusting the laser beam such that the beam follows the track on the data recording surface of the optical disc 2, and then supplies the track search signal to the optical pickup 3. For example, while moving the objective lens of the optical pickup 3 gradually in the disc radial direction in accordance with the track search signal, the servo circuit 6 performs, in accordance with the tracking error signal supplied from the matrix circuit 10 at that time, a track pull-in operation so that the laser beam follows the track on the data recording surface.

After completing the track pull-in operation, the servo circuit 6 produces a tracking control signal from the tracking error signal, which the matrix circuit 10 continuously supplies to the servo circuit 6, and then supplies the tracking control signal to the optical pickup 3. In accordance with the tracking control signal, the servo circuit 6 moves the objective lens of the optical pickup 3 in the disc radial direction, so that the laser beam follows the track on the data recording surface of the optical disc 2. In that manner, such a tracking servo loop, which includes the servo circuit 6, the optical pickup 3 and the matrix circuit 10, is formed. Accordingly, the laser beam follows the track of the optical disc 2.

After completing the focus pull-in operation and the track pull-in operation, the matrix circuit 10 interprets the photoelectric signals, which the optical pickup 3 continuously supplies, as values of voltage, and then selectively uses them to perform a matrix arithmetic process, an amplification process and the like. In this manner, the matrix circuit 10 produces from the photoelectric signals a wobble signal, which indicates the amplitude of the wobbled groove formed on the optical disc 2, as well as the focus error signal and the tracking error signal. The matrix circuit 10 then transmits the wobble signal to a wobble circuit 11.

After receiving the wobble signal form the matrix circuit 10, the wobble circuit 11 demodulates the wobble signal into streaming data, which will be used for detecting the information of disc address. The wobble circuit 11 then supplies the streaming data to an address generation circuit 12. The address generation circuit 12 decodes the streaming data into the disc address information, which is then supplied to the system controller 5. In accordance with the disc address information supplied from the address generation circuit 12, the system controller 5 detects the position of the spot of the laser beam on the data recording surface of the optical disc 2.

By the way, after starts running in startup mode, the system controller 5 can detect the disc address information, or the position of the spot of the laser beam on the data recording surface of the optical disc 2. And after receiving a write command from the AV system AVS1, the system controller 5 switches to recording mode. At this time, the matrix circuit 10 transmits the wobble signal to both the wobble circuit 11 and the address generation circuit 12.

In this case, while generating the disc address information as described above, the address generation circuit 12 performs a Phased Lock Loop (PLL) process using the wobble signal supplied from the matrix circuit 10 and generates operational clock pulses (also referred to as "recording-operational clock pulses"), which are synchronized with the frequency of the wobbling of the groove: The recording-operational clock pulses are used for recording data. The address generation circuit 12 supplies the recording-operational clock pulses to all the circuits.

Based on the recording-operational clock pulses supplied from the address generation circuit 12, the spindle drive circuit 7 for example detects the current rotation speed of the spindle motor 8. The spindle drive circuit 7 then compares the detected speed with a predetermined reference speed at which the Constant Linear Velocity scheme can be realized (in which the linear velocity of the optical disc 2 is constant) and generates a spindle error signal that indicates how much the rotation speed of the spindle motor 8 exceeds or falls behind the reference speed.

Based on the spindle error signal, the spindle drive circuit 7 generates a spindle control signal, which is then supplied to the spindle motor 8. In this manner, the spindle drive circuit 7 rotates the spindle motor 8 in accordance with the spindle control signal so that the rotation of the optical disc 2 is in a constant linear velocity.

After that, when the AV system AVS1 specifies a piece of address information about a write start position at which data start to be written, the system controller 5 compares a piece of disc address information supplied from the address generation circuit 12, which indicates the position of the spot of the laser beam on the data recording surface of the optical disc 2 at this time, with the piece of address information of the write start position to generate a seek instruction signal. The system controller 5 then transmits the seek instruction signal to the servo circuit 6.

When receiving the seek instruction signal from the system controller 5, the servo circuit 6 temporarily stops the tracking servo loop for a while, generates a seek control signal from the seek instruction signal and then transmits the seek control signal to the sled mechanical section 4. By driving the sled mechanical section 4 to move the optical pickup 3 over the tracks in the disc radial direction in accordance with the seek control signal, the servo circuit 6 performs a seeking operation.

Incidentally, when moving the optical pickup 3 in the disc radial direction during the seeking operation, the system controller 5 generates a track jump instruction signal and supplies it to the servo circuit 6. After receiving the track jump instruction signal from the system controller 5, the servo circuit 6, which still stops the tracking servo loop, generates a jump control signal from the track jump instruction signal and then transmits it to the sled mechanical section 4.

Based on the jump control signal, the servo circuit 6 drives the sled mechanical section 4 to move the optical pickup 3 a little distance in the disc radial direction. In this manner, the servo circuit 6 alters the position of the spot of the laser beam on the optical disc 2 so that the spot of the laser beam is on the track including the write start position of data, i.e. the servo circuit 6 pulls the laser beam in the track. After completing that pull-in operation, the servo circuit 6 forms the tracking servo loop again.

With the spot of the laser beam just being on the track including the write start position of data, the system controller 5 receives data which the AV system AVS1 supplies for recording and transmits the data to the encoder/decoder 13, which runs in synchronization with the recording-operational clock pulses supplied from the address generation circuit 12.

While storing the data supplied from the AV system AVS1 in an internal buffer, the encoder/decoder 13 performs an encoding process to the data stored in the internal buffer: The encoding process includes adding an error correcting code to each block of the data, adding an interleaved code or adding a sub-code. The encoder/decoder 13 subsequently transmits resulting each block of encoded data to a reader/writer circuit 14.

The reader/writer circuit 14 is designed to perform data processes in PRML scheme. The reader/writer circuit 14 runs in synchronization with the recording-operational clock pulses supplied from the address generation circuit 12. The reader/write 14 modulates the encoded data supplied from the encoder/decoder 13 into a different form of data (also referred to as "modulated data"), and then performs a write compensation process to the modulated data: The write compensation process includes adjusting the output power of the laser beam to be suitable for writing data in accordance with the shape of the spot of the laser beam, the linear velocity of the optical disc 2 and the like, and adjusting the waveform of the laser beam. The reader/writer circuit 14 supplies a resultant laser control signal to a laser driver 9.

The laser driver 9 receives the laser control signal from the reader/writer circuit 14 and then transmits it to the optical pickup 3. Following the laser control signal supplied from the laser driver 9, the laser diode of the optical pickup 3 intermittently emits a laser beam, which is then collected by the objective lens before reaching the data recording surface of the optical disc 2. As a result, a pit (or a phase change mark) is formed on the data recording surface of the optical disc 2 under the spot of the laser beam. In this manner, the system controller 5 can record data by forming pits on the data recording surface of the optical disc 2.

Incidentally, the optical pickup 3 contains a photodetector to monitor the output power of the laser beam (this photodetector is also referred to as "monitoring photodetector"). The photodetector receives the reflection of the laser beam from the data recording surface of the optical disc 2 and then converts it into an electric signal. In this manner, the optical pickup 3 produces a signal for monitoring the output power of the laser beam (also referred to as "output monitoring signal"), and then transmits the output monitoring signal to the laser driver 9.

The laser driver 9 includes an Auto Power Control (APC) circuit. While controlling the laser diode of the optical pickup 3, the laser driver 9 transfers the output monitoring signal supplied from the optical pickup 3 to the APC circuit. With the APC circuit monitoring the output power of the laser beam by referring to the output monitoring signal, the laser driver 9 adjusts the value of the laser control signal appropriately, thereby maintaining the output power at a predetermined level suitable for writing data regardless of change in ambient temperature.

On the other hand, while recording data on the data recording surface of the optical disc 2, the servo circuit 6 generates a sled control signal from a sled error signal which is acquired as a low frequency component of the tracking error signal, and then transmits the sled control signal to the sled mechanical section 4. In this manner, the servo circuit 6 drives the sled mechanical section 4 by using the sled control signal and then gradually moves the optical pickup 3 in the disc radial direction. In this manner, the servo circuit 6 can record data on the data recording surface of the optical disc 2 along the track.

On the other hand, after entering in startup mode to be able to detect the disc address information, or the position of the spot of the laser beam on the data recording surface of the optical disc 2, the system controller 5 enters in reproducing mode if it for example receives a read command from the AV system AVS1. If the AV system AVS1, at this time, specifies a piece of address information about a read start position of data, the system controller 5 compares a piece of disc address information supplied from the address generation circuit 12, which indicates the position of the spot of the laser beam on the data recording surface of the optical disc 2 at this time, with the piece of address information of the write start position to generate a seek instruction signal.

After generating the seek instruction signal, the system controller 5 controls the servo circuit 6 to perform a seeking process of the optical pickup 3 in a similar way to the above-noted recording mode. In addition, in a similar way to the above, the system controller 5 controls the servo circuit 6 to pull the spot of the laser in the track including the read start position of data on the optical disc 2.

Moreover, the system controller 5 specifies a value of the output power of the laser beam for reading data. In accordance with the specified value, the laser driver 9 generates a laser control signal to emit the laser beam continuously for reading data, and then transmits the laser control signal to the optical pickup 3.

Therefore, by referring to the laser control signal supplied from the laser driver 9, the laser diode of the optical pickup 3 continuously emit a laser beam, which is then collected by the objective lens before reaching the data recording surface of the optical disc 2. The photo-detectors of the optical pickup 3 receives the reflection of the laser beam from the data recording surface of the optical disc 2 and convert it into an electric signal, or a photoelectric signal, which is then supplied to the matrix circuit 10.

After receiving the photoelectric signals from the optical pickup 3, the matrix circuit 10 interprets the photoelectric signals as values of voltage, and selectively uses them to perform a matrix arithmetic process, an amplification process and the like. In this manner, the matrix circuit 10 produces from the photoelectric signal an analog high-frequency signal (also referred to as "RF signal"), which is the equivalent of data recorded on the data recording surface of the optical disc 2, as well as the focus error signal, the tracking error signal and the wobble signal. The matrix circuit 10 transmits the focus error signal and the tracking error signal to the servo circuit 6, the wobble signal to the wobble circuit 11 and the RF signal to the reader/writer circuit 14.

By using the RF signal, the reader/writer circuit 14 performs a PLL process and generates clock pulses for reproducing data (also referred to as "reproducing-operational clock pulses"). The reader/writer circuit 14 supplies the reproducing-operational clock pulses to all the circuits. In addition, the reader/writer circuit 14 converts the analog RF signal supplied from the matrix circuit 10 into a digital RF signal, performs a partial response equalization process and a maximum likelihood decoding process in PRML scheme, and then supplies resulting binary decoded data to the encoder/decoder 13.

The encoder/decoder 13 runs in synchronization with the reproducing-operational clock pulses supplied from the reader/writer circuit 14. The encoder/decoder 13 performs a decoding process to the decoded data supplied from the reader/writer circuit 14: The decoding process includes decoding an error correcting code, an interleaved code or the like for each block of the decoded data. In this manner, the encoder/decoder 13 reproduces data and stores them in an internal buffer.

While storing each block of data in the buffer, the encoder/decoder 13 follows the commands of the AV system AVS1 and reads out a predetermined number of blocks of data from the buffer to transfer them to the AV system AVS1. In this manner, the system controller 5 reproduces data from the data recording surface of the optical disc 2 and transfers them to the AV system AVS1.

Incidentally, the spindle drive circuit 7 for example detects from the reproducing-operational clock pulses supplied from the reader/writer circuit 14 the current rotation speed of the spindle motor 8. The spindle drive circuit 7 compares the detected speed with a reference speed, which is for keeping the linear velocity of the optical disc 2 at a constant speed, and generates a spindle error signal.

The spindle drive circuit 7 generates a spindle control signal from the spindle error signal and then transmits the spindle control signal to the spindle motor 8. In this manner, the spindle drive circuit 7 rotates the spindle motor 8 by using the spindle control signal such that the linear velocity of the optical disc 2 is kept at a constant level.

Even when running in reproducing mode, the monitoring photodetector of the optical pickup 3 receives part of the reflection of the laser beam from the data recording surface of the optical disc 2 and then converts it into an electric signal, or an output monitoring signal, and then transmits the output monitoring signal to the laser driver 9. While controlling the laser diode, the laser driver 9 transfers the output monitoring signal supplied from the optical pickup 3 to the APC circuit. With the APC circuit monitoring the output power of the laser beam by referring to the output monitoring signal, the laser driver 9 adjusts the value of the laser control signal, thereby maintaining the output power at a predetermined level suitable for reading data regardless of change in ambient temperature.

In addition, the servo circuit 6 generates a sled control signal, which is then supplied to the sled mechanical section 4 to drive it. As a result, the sled mechanical section 4 gradually moves the optical pickup 3 in the disc radial direction. In this manner, the servo circuit 6 reproduces data from the data recording surface of the optical disc 2 by following the track.

Figure 3:
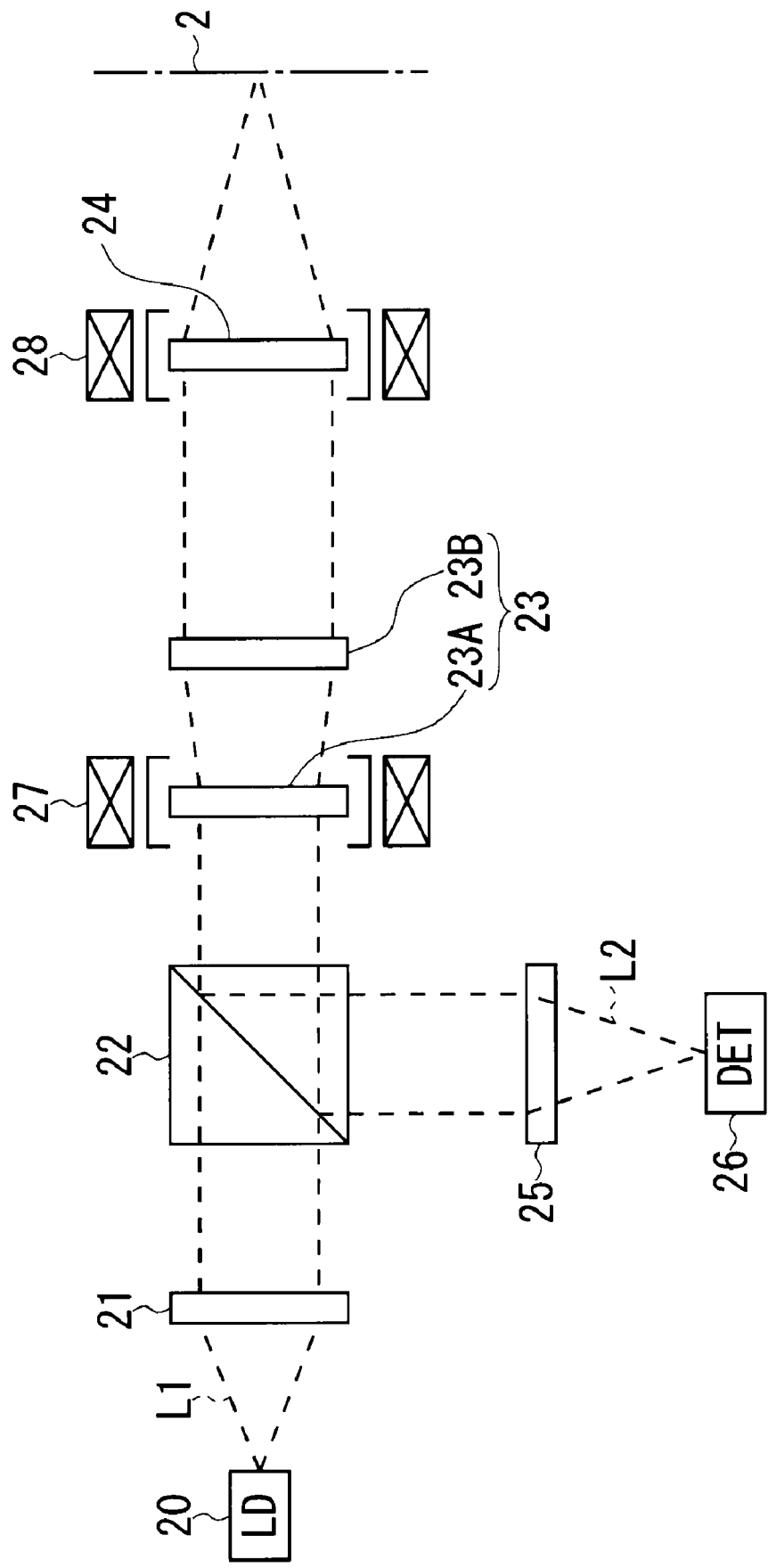
FIG. 3 is a block diagram illustrating the configuration of an optical pickup.

FIG. 3 illustrates the configuration of the optical pickup 3. The optical pickup 3 includes a laser diode 20 that receives a laser control signal from the laser driver 9. In the optical pickup 3, the laser diode 20 emits a laser beam L1 according to the laser control signal; the collimator lens 21 converts the laser beam L1 into collimated beam; and, after passing through a beam splitter 22 and a group of spherical aberration correction lenses 23, the collimated beam is collected by an objective lens 24 and reaches the data recording surface of the optical disc 2.

A reflection beam L2, which is the reflection of the laser beam L1 from the data recording surface of the optical disc 2, passes through the objective lens 24 and the group of spherical aberration correction lenses 23 before being reflected by the beam splitter 22. The reflection beam L2 from the beam splitter 22 is then collected by the collimator lens 26 before a plurality of photo-detectors of a light-receiving section 26 receives it. The photo-detectors convert the reflection beam L2 into an electric signal, or a photoelectric signal, which is then supplied to the matrix circuit 10.

The group of spherical aberration correction lenses 23 includes a movable lens 23A and a fixed lens 23B. The movable lens 23A is situated on an actuator 27. The actuator 27 moves the movable lens 23A along the optical axis in the approaching and departing directions. As the movable lens 23A is moved by the actuator 27 along the optical axis in the approaching or departing direction, the wave front of the laser beam L1 defocuses and the object point of the objective lens 24 is adjusted, thereby correcting the spherical aberration related to the laser beam L1.

The objective lens 24 is situated on a two-axis actuator 28. The two-axis actuator 28 moves the objective lens 24 in the direction of the optical axis or in the disc radial direction. As the objective lens 24 is moved by the two-axis actuator 28 in the direction of the optical axis or in the disc radial direction, the laser beam L1 gets focused on the data recording surface of the optical disc 2. Moreover, as the objective lens 24 is moved by the two-axis actuator 28 in the disc radial direction, the spot of the laser beam L1 is led to the track on the data recording surface of the optical disc 2.

Figure 4:
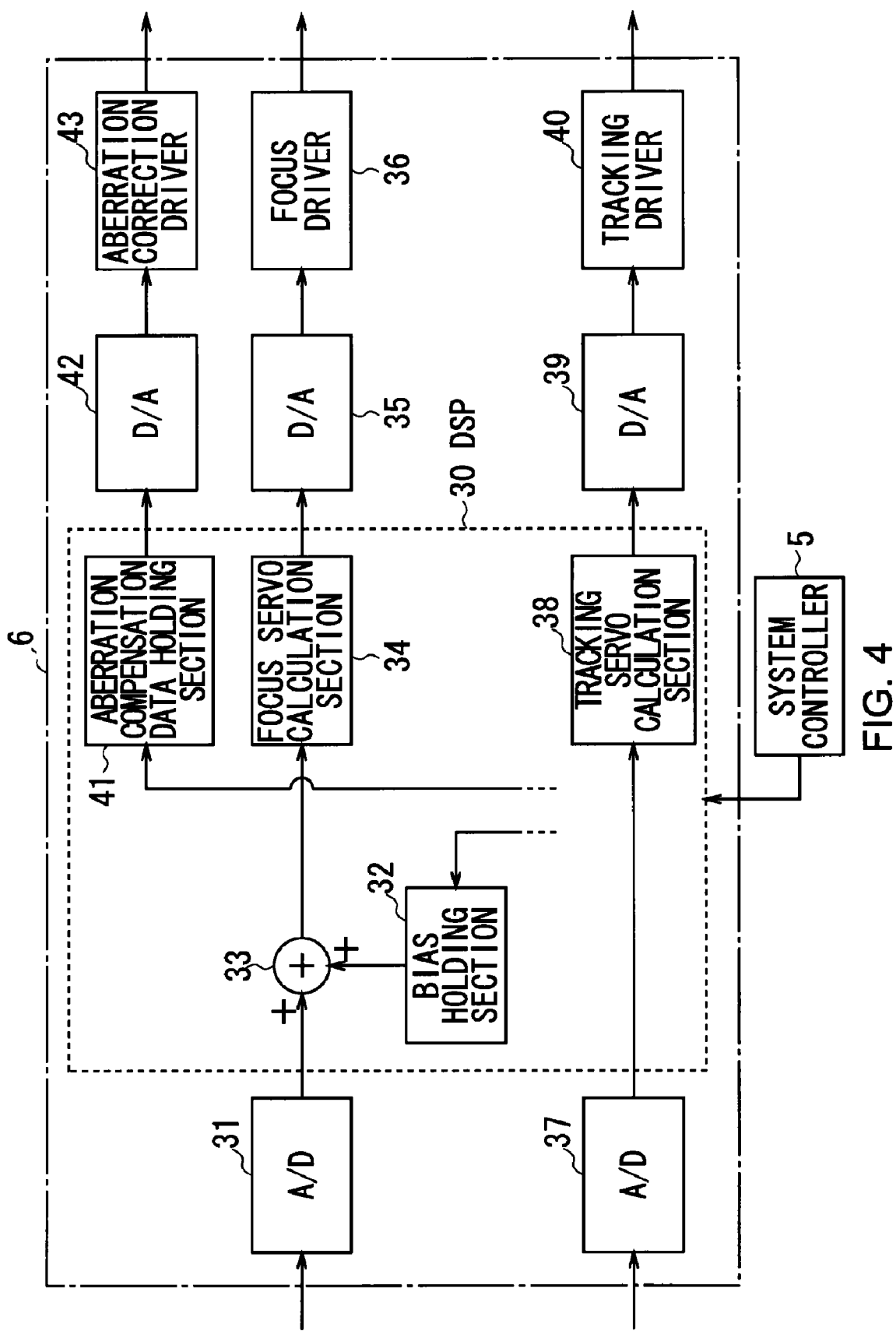
FIG. 4 is a block diagram illustrating the configuration of a servo circuit.

FIG. 4 illustrates the internal configuration of the servo circuit 6. The servo circuit 6 includes a Digital Signal Processor (DSP) 30. When receiving an analog focus error signal from the matrix circuit 10, a analog-to-digital converter 31 converts it into focus error data, which is then transferred to the DSP 30.

The DSP 30 includes a bias holding section 32 that holds lens' position compensation data (also referred to as "focus bias data") representing a predetermined lens' position compensation value (also referred to as "bias value") for correcting the position of the objective lens 24 (also referred to as "lens' position"). The DSP 30 transfers the focus error data to an accumulator 33 which adds the focus bias data read out from the bias holding section 32 to the focus error data. The result of addition is supplied to a focus servo calculation section 34. The focus servo calculation section 34 performs a predetermined calculation process, such as a phase compensation process (like filtering) and a loop gain process, by using the result of addition, and generates focus control data.

After the DSP 30 generates the digital focus control data, a digital-to-analog converter 35 converts it into an analog focus control signal, which is then supplied to a focus driver 36. The servo circuit 6 transfers the focus control signal supplied from the focus driver 36 to the two-axis actuator 28 of the optical pickup 3 (i.e. a focus coil, in this case) to activate it. In this manner, the servo circuit 6 corrects the position of the objective lens 24 (FIG. 2): As the objective lens 24 moves along the optical axis in the approaching or departing direction, the laser beam L1 is being focused on the data recording surface of the optical disc 2.

In the servo circuit 6, when receiving an analog tracking error signal from the matrix circuit 10, an analog-to-digital converter 37 converts it into digital tracking error data, which are then supplied to the DSP 30. The DSP 30 transfers the tracking error data to a tracking servo calculation section 38. The tracking servo calculation section 38 performs a predetermined calculation process, such as a phase compensation process (like filtering) and a loop gain process, by using the tracking error data, and generates tracking control data.

After the DSP 30 generates the digital tracking control data, a digital-to-analog converter 39 converts it into an analog tracking control signal, which is then supplied to a tracking driver 40. The servo circuit 6 transfers the tracking control signal supplied from the tracking driver 40 to the two-axis actuator 28 of the optical pickup 3 (or a tracking coil, in this case) to activate it: As the objective lens 24 moves in the disc radial direction, the spot of the laser beam L1 follows the track on the data recording surface of the optical disc 2.

Moreover, the DSP 30 includes a aberration compensation data holding section 41 that holds spherical-aberration-compensation data representing a predetermined spherical-aberration-compensation value (also referred to as "aberration compensation value") for correcting the spherical aberration related to the laser beam L1. While emitting the laser beam L1 to the data recording surface of the optical disc 2, the DSP 30 reads out the spherical-aberration-compensation data from the aberration compensation data holding section 41.

After the DSP 30 reads out the spherical-aberration-compensation data from the aberration compensation data holding section 41, a digital-to-analog converter 42 converts the spherical-aberration-compensation data into an analog spherical-aberration-compensation signal, which is then supplied to a aberration correction driver 43. The servo circuit 6 transfers the spherical-aberration-compensation signal from the aberration correction driver 43 to the actuator 27 of the optical pickup 3 to activate it. In this manner, the servo circuit moves the movable lens 23A a predetermined distance along the optical axis in the approaching or departing direction, thereby correcting the spherical aberration related to the laser beam L1.

By the way, after entering in startup mode to be able to detect the disc address information, or the position of the spot of the laser beam on the data recording surface of the optical disc 2, the system controller 5 starts a compensation value setting process to set the bias value of the focus bias data and the aberration compensation value of the spherical-aberration-compensation data. In this case, the system controller 5 controls the servo circuit 6 to drive the sled mechanical section 4, which then moves the optical pickup 3 in the disc radial direction appropriately. In addition, the system controller 5 for example emits the laser beam L1 continuously toward the track of the data recording surface of the optical disc 2, where trial data are previously recorded.

Moreover, the system controller 5 controls the matrix circuit 10 to generate the RF signal. While emitting the laser beam L1 to the track where trial data are previously recorded, a plurality of photo-detectors of the optical disc 3 receives the reflection beam L2 from the track and converts it into a photoelectric signal, which is then supplied to the matrix circuit 10.

The matrix circuit 10 generates from the photoelectric signals supplied from the optical pickup 3 an analog RF signal as well as a focus error signal, a tracking error signal and a wobble signal, and then supplies the RF signal to the reader/writer circuit 14. The reader/writer circuit 14 performs a PLL process using the RF signal supplied from the matrix circuit 10 to produce the reproducing-operational clock pulses. Accordingly, the reader/writer circuit 14 operates in synchronization with the reproducing-operational clock pulses.

Figure 5:
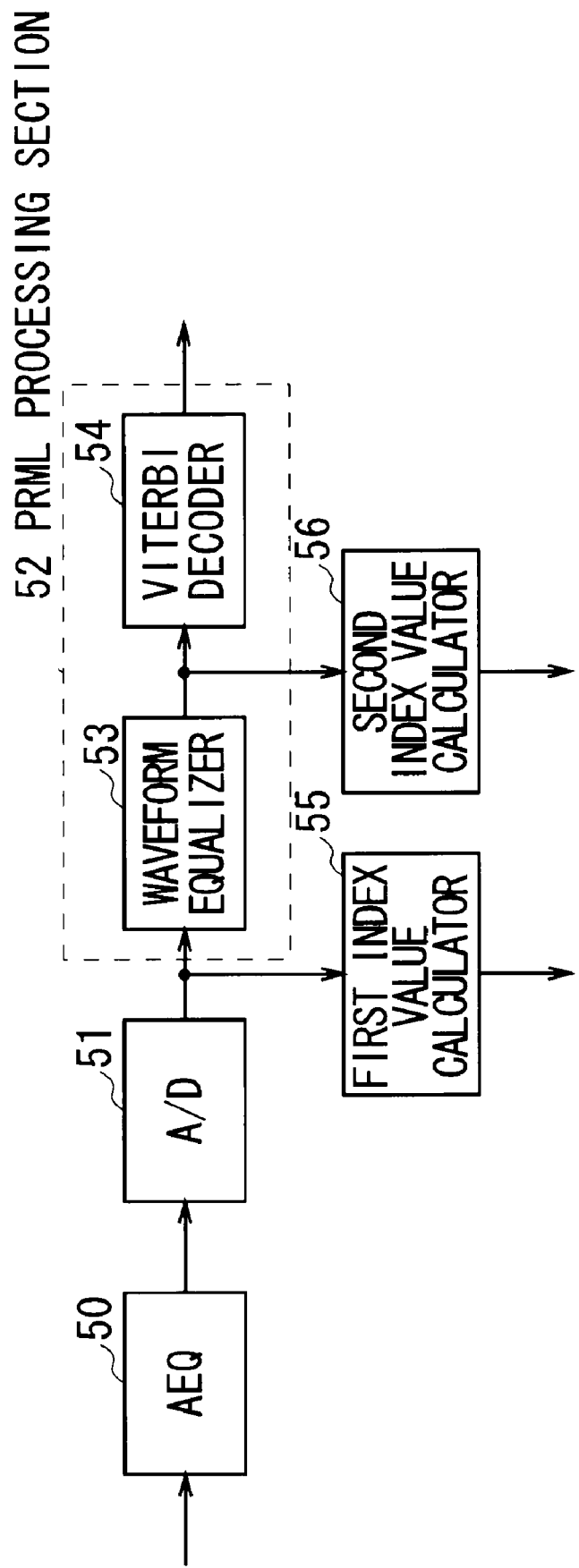
FIG. 5 is a block diagram illustrating the configuration of a reader/writer circuit.

As shown in FIG. 5, the reproducing system of the reader/writer circuit 14 also transfers the RF signal from the matrix circuit 10 to an analog equalizer 50. The analog equalizer 50 of the reader/writer circuit 14 performs a correction process by which the high frequency components of the RF signal supplied from the matrix circuit 10 are for example emphasized. Subsequently, an analog-to-digital converter 51 converts a resulting analog readout signal into digital readout data, which is then supplied to a waveform equalizer 53 of a PRML processing section 52 that performs a process in a PRML scheme.

The waveform equalizer 53 performs a partial response equalizing process to the readout data supplied from the analog equalizer 50 via the analog-to-digital converter 51: The partial response equalizing process equalizes the readout data in accordance with the predetermined classes of partial response to generate multi-valued data. The waveform equalizer 53 then transmits the resulting multi-valued waveform-equalized data to a Viterbi decoder 54.

The Viterbi decoder 54 receives the waveform-equalized data from the waveform equalizer 53 and then performs a Viterbi decoding process (i.e. a maximum likelihood decoding process) by using the waveform-equalized data. In synchronization with the reproducing-operational clock pulses, the Viterbi decoder 54 repeatedly calculates a Euclidean distance, which is the square of a difference between a value of the waveform-equalized data and each value of a plurality of data sets which are candidates for demodulated data. In addition, the Viterbi decoder 54 calculates the sum of the squares (which is a metric, a quantity representing how likely it is correct) by following each path (or each of a plurality of data rows generated as the candidate data sequentially change). The Viterbi decoder 54 chooses from among those paths one whose sum of the squares is a minimum (i.e. which is considered to be the most reliable) and regards it as demodulated data. In this manner, the Viterbi decoder 54 produces the binary demodulated data from the multi-valued waveform-equalized data.

In that manner, the system controller 5 reads out from the data recording surface of the optical disc 2 the trial data. At the same time, the system controller 5 selects from among many combinations of bias values and aberration compensation values (those combinations are also referred to as "pairs of compensation values") some of the pairs of compensation values. In addition, the system controller 5 sequentially transmits to the servo circuit 6 the pieces of focus bias data and spherical-aberration-compensation data corresponding to the selected pairs of compensation values. As a result, the bias holding section 32 of the DSP 30 holds the pieces of focus bias data while the aberration compensation data holding section 41 holds the pieces of spherical-aberration-compensation data.

In the servo circuit 6, the DSP 30, under the control of the system controller 5, sequentially reads out the pieces of focus bias data, each of which represents a different bias value, from the bias holding section 32 to supply them to the accumulator 33, which adds each piece of focus bias data to the focus error data to generate the focus control data. The servo circuit 6 transmits the focus control data to the two-axis actuator 28 of the optical pickup 3 as a focus control signal to activate it.

Moreover, in the servo circuit 6, the DSP 30, under the control of the system controller 5, sequentially reads out the pieces of spherical-aberration-compensation data, each of which represents a different aberration compensation value, from the aberration compensation data holding section 41, and transmits them to the actuator 27 of the optical pickup 3 as a spherical-aberration-compensation signal to activate it. In this manner, the system controller 5 performs a trial correction process in which the lens' position and the spherical aberration are corrected by the arbitrarily selected pairs of compensation values on trial. In addition, each time such a trial correction process is performed, the system controller 5 calculates index values which represent the evaluation of the pairs of compensation values.

More specifically, each time the lens' position and the spherical aberration are corrected by various pairs of compensation values on trial basis, the analog equalizer 50, under the control of the system controller 5, supplies the readout signal to the analog-to-digital converter 51, which converts it into the readout data. The readout data are also supplied to a first index value calculator 55. The first index value calculator 55 detects jitter components of the readout data, which occur along the time axis.

The jitter component of the readout data is a physical quantity representing the change of information of the readout data over time. The information of the readout data is recorded as pits on the data recording surface of the optical disc 2. The jitter components become small, as the laser beam L1 is more appropriately focused on the data recording surface of the optical disc 2, in which case the laser beam L1 forms a small spot on the data recording surface. Whereas the jitter components become large, as the laser beam L1 is not appropriately focused on the data recording surface of the optical disc 2, in which case the laser beam L1 forms a relatively-large circular spot on the data recording surface.

The more the pairs of compensation values are optimized, the smaller the jitter components will be. This means the jitter components can serve as index values representing the evaluation of the pairs of compensation values. After the first index value calculator 55 measures the jitter components of the readout data, the first index value calculator 55 regards the inverse number of the value of the jitter components as a first index value: The greater the first index value, the more positive the evaluation of the pair of the compensation values. The first index calculator 55 transmits the first index value to the system controller 5.

Moreover, each time the lens' position and the spherical aberration are corrected by various pairs of compensation values on trial basis, the waveform equalizer 53 of the PRML processing section 52, under the control of the system controller 5, transmits the value of the waveform-equalized data of each reproducing-operational clock to a second index value calculator 56, which for example previously holds the above trial data and waveform data representing a reference waveform of partial response. The second index value calculator 56 generates target data from the trial data and the waveform data. The second index value calculator 56 also calculates the sum of equivalent errors, which are the differences between the values of waveform-equalized data of each reproducing-operational clock supplied from the waveform equalizer 53 and the value of the target data.

The second index value calculator 56 then calculates the square of the sum of the equivalent errors of each sample and accumulates them. Therefore, the second index value calculator 56 gains a value, which is proportional to the dispersion of noise, by projecting on an error vector. The second index value calculator 56 subsequently calculates the inverse of the value to gain a data-quality-evaluation index value for the waveform-equalized data, known as Partial Response Signal to Noise Ratio (PRSNR): The greater the data-quality-evaluation index value, the higher the quality of data.

That means that, as the laser beam L1 is more appropriately focused on the data recording surface of the optical disc 2 to follow a row of pits, the data quality improves due to the reduction of noise in the waveform-equalized data, thereby increasing the data-quality-evaluation index value; as the laser beam L1 is not appropriately focused on the data recording surface of the optical disc 2, the data quality decreases due to the increase of noise in the waveform-equalized data, thereby decreasing the data-quality-evaluation index value.

The more the pairs of compensation values are optimized, the greater the data-quality-evaluation index value will be. This means the data-quality-evaluation index value can serve as an index value representing the evaluation of the pairs of compensation values. After the second index value calculator 56 calculates the data-quality-evaluation index value, the second index value calculator 56 transmits it to the system controller 5 as a second index value.

In this manner, the first index calculator 55 calculates from the readout data, which are the same data as those transmitted to the PRML processing section 52, the first index values representing the evaluation of the pairs of compensation values; the second index calculator 56 calculates from the waveform-equalized data, which are generated by the process of the PRML processing section 52, the second index values representing the evaluation of the pairs of compensation values.

Figure 6:
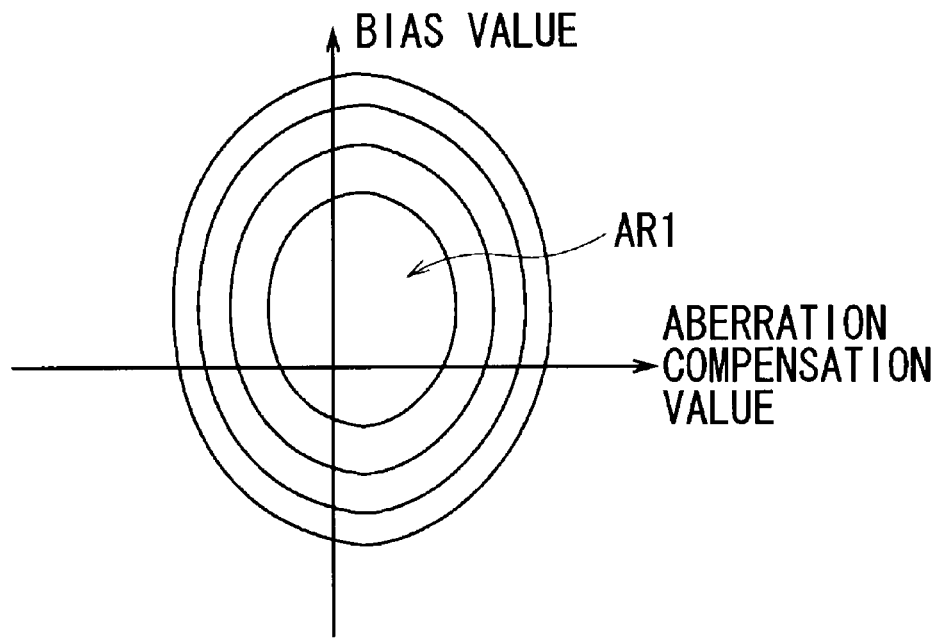
FIG. 6 is a schematic diagram illustrating first-index-value characteristics.

Note that the readout data have not been corrected as accurately as those generated by the process of the PRML processing section 52. FIG. 6 is a graph related to the first index values generated from the readout data, in which the aberration compensation values are plotted along the horizontal axis and the bias values along the vertical axis: The graph shows contour lines, each of which is a group of the first index values at the same level. Those concentric contour lines, each of which has a distorted shape extending along the vertical axis, represent the characteristics of the first index values.

As for the characteristics of the first index values (also referred to as "first-index-value characteristics"), the innermost contour line is a group of maximum first index values: The more it goes outside, the smaller the first index values will be. Within an area AR1 of the innermost contour line (also referred to as "first area"), there exist the pairs of compensation values whose first index values are relatively high enough so that data will be appropriately recorded or reproduced (i.e. improving the data writing capability and the data recording capability) if those pairs are applied for correcting the lens' position and the spherical aberration (in which case, all the pairs of compensation values, or the combinations of bias values and the aberration compensation values, are plotted on a two-dimensional graph to grasp the position of each pair of compensation values on a two-dimensional plane). The values between the second and third innermost contour lines may decrease the data writing capability and the data writing capability: The more they go outside, the lower those capabilities will be.

Figure 1:
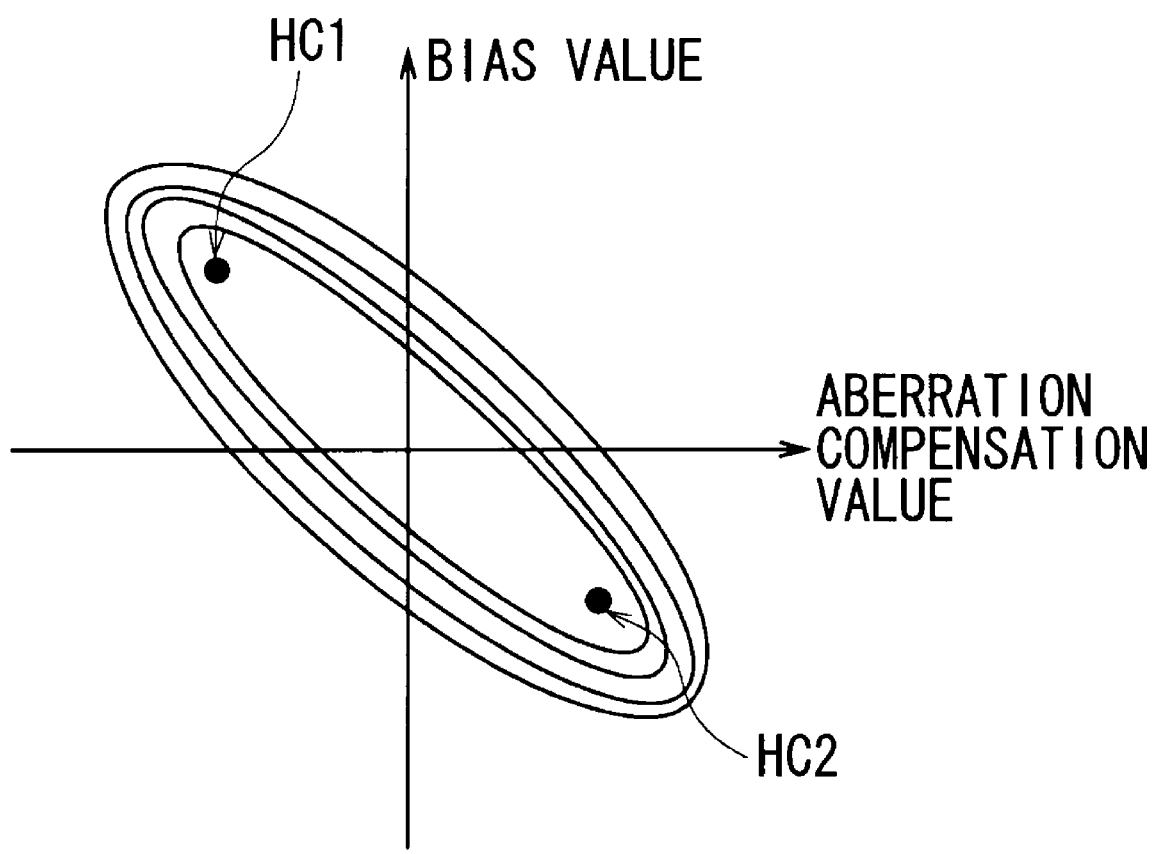
FIG. 1 is a schematic diagram illustrating an evaluation value acquired as a result of the process of PRML.
Figure 7:
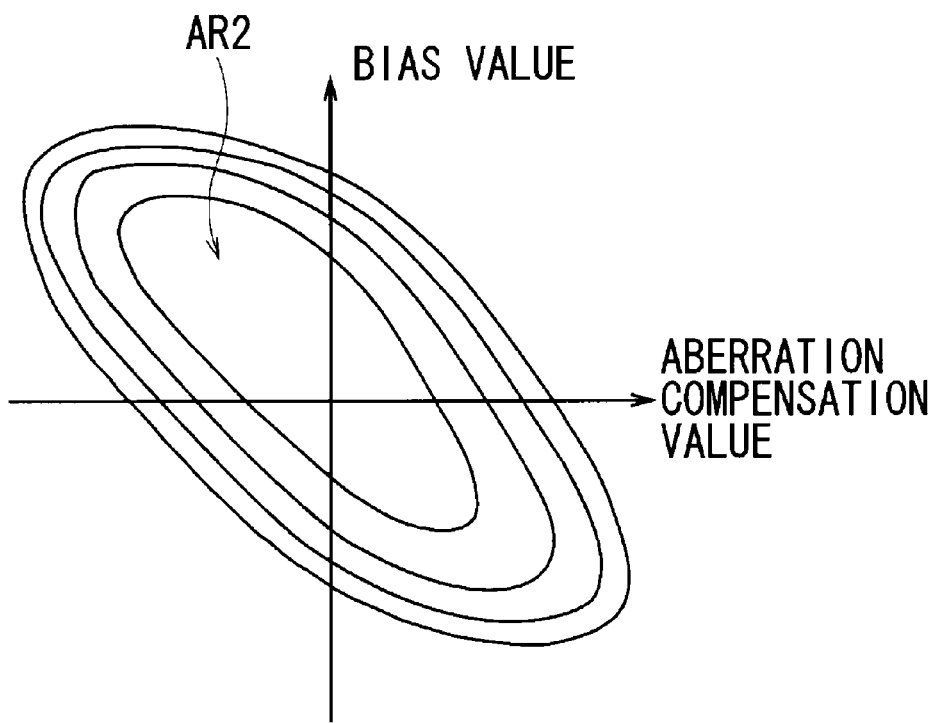
FIG. 7 is a schematic diagram illustrating second-index-value characteristics.

On the other hand, the waveform-equalized data have been more accurately corrected because they were processed by the PRML processing section 52. The waveform-equalized data therefore represent a similar characteristic to that of FIG. 1 in terms of evaluation values. FIG. 7 is a graph related to the second index values generated from the waveform-equalized data, in which the aberration compensation values are plotted along the horizontal axis and the bias values along the vertical axis: The graph shows contour lines, each of which is a group of the second index values at the same level. Those concentric contour lines, each of which has a distorted shape extending in a certain direction and narrowing in a direction perpendicular to the certain direction, represent the characteristics of the second index values.

As for the characteristics of the second index values (also referred to as "second-index-value characteristics"), which is different from those of the first index values, the innermost contour line is a group of maximum second index values: The more it goes outside, the smaller the second index values will be. Within an area AR2 of the innermost contour line (also referred to as "second area"), there exist the pairs of compensation values whose second index values are relatively high enough so that data will be appropriately recorded or reproduced (i.e. improving the data writing capability and the data recording capability) if those pairs are applied for correcting the lens' position and the spherical aberration. The values between the second and third innermost contour lines may decrease the data writing capability and the data writing capability: The more they go outside, the lower those capabilities will be.

If the position of each pair of compensation values of the first index values is compared with that of the second index values, the center portion of the second area AR2 covers substantially the same area as the first area AR1 of the first-index-value characteristics. This means that the pairs of compensation values in the center portion of the second area AR2 have the relatively-high first and second index values. The system controller 5 finds an appropriate pair of compensation values from those relatively-high first and second index values.

Incidentally, the bias value for correcting the lens' position and the aberration compensation value for correcting the spherical aberration can be changed arbitrarily. Accordingly, among the pairs of compensation values (i.e. the combinations of bias values and aberration compensation values), some pairs have the same bias value and different aberration compensation values, or the same aberration compensation value and different bias values; some have totally different bias and aberration compensation values.

If the combinations of bias values and aberration compensation values (i.e. the pairs of compensation values) are plotted on the tow-dimensional graph, most adjacent pairs have the same bias value and slightly different aberration compensation values, or the same aberration compensation value and slightly different bias values, or slightly different aberration compensation values and slightly different bias values. Therefore, those pairs will be also referred to as "adjacent pairs" from the viewpoint of the two-dimensional graph.

Since there are many combinations of bias and aberration compensation values, it takes time for the system controller 5 to try all the combinations in correcting the lens' position and the spherical aberration on trial basis and calculating the first and second index values each time. This means the system controller 5 may have difficulties in setting the pair of compensation values for correcting the lens' position and the spherical aberration because it takes time.

However, the first and second index value characteristics are dependent on the configuration of the optical system and the circuit: If the recording and reproducing devices 1 have the same configuration of the optical system and circuits and use the same type of optical discs 2, they are able to produce the first index values of almost the same first-index-value characteristics from the readout data and the second index values of almost the same second-index-value characteristics from the waveform-equalized data.

Accordingly, a simulation is previously run on another recording and reproducing device 1 that has the same optical system and circuit configuration to calculate the first- and second-index-value characteristics, which are used by the other recording and reproducing devices 1. Therefore, the system controller 5 can set, during a compensation value setting process, the pair of compensation values for correcting the lens' position and the spherical aberration, without calculating the first and second index values and the first- and second-index-value characteristics of all the pair of compensation values. More specifically, the system controller 5 previously picks up some pairs of compensation values based on the simulation of the first-index-value characteristics, which might yield the relatively high first index values.

The system controller 5 then selectively uses those pairs and corrects the lens' position and the spherical aberration on trial basis to calculate the first index values. In this manner, the system controller 5 finds a pair of compensation values that yield a relatively high first index value.

Similarly, the system controller 5 previously picks up some pairs of compensation values based on the simulation of the second-index-value characteristics, which might yield the relatively high second index values. The system controller 5 then selectively uses those pairs and corrects the lens' position and the spherical aberration on trial basis to calculate the second index values. In this manner, the system controller 5 finds a pair of compensation values that yield a relatively high second index value. Since the system controller 5 does not use the remaining pairs of compensation values that might yield the relatively low first and second index values for a trial correction process, the system controller 5 can complete the compensation value setting process faster than ever.

After calculating the first and second index values from the pairs of compensation values in that manner, the system controller 5 use those first and second index values to select one pair of compensation values and then sets the selected pair for correcting the lens' position and the spherical aberration. Here, there are four types of setting methods, one of which may be applied to the compensation value setting process by the system controller 5. The following describes the first to fourth setting methods.

Figure 8:
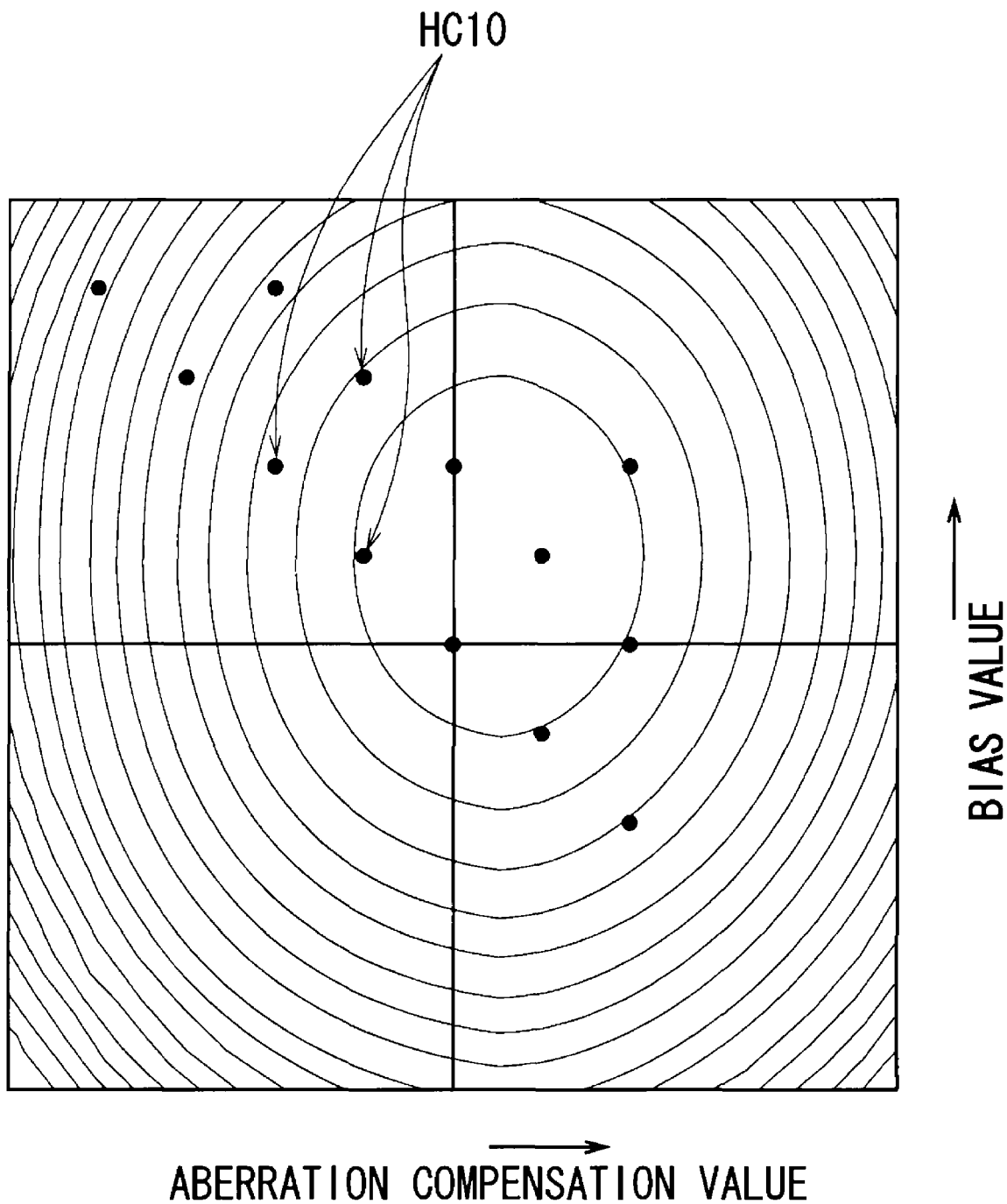
FIG. 8 is a schematic diagram illustrating the calculation of a first index value by a compensation value setting process employing a first setting method.
Figure 9:
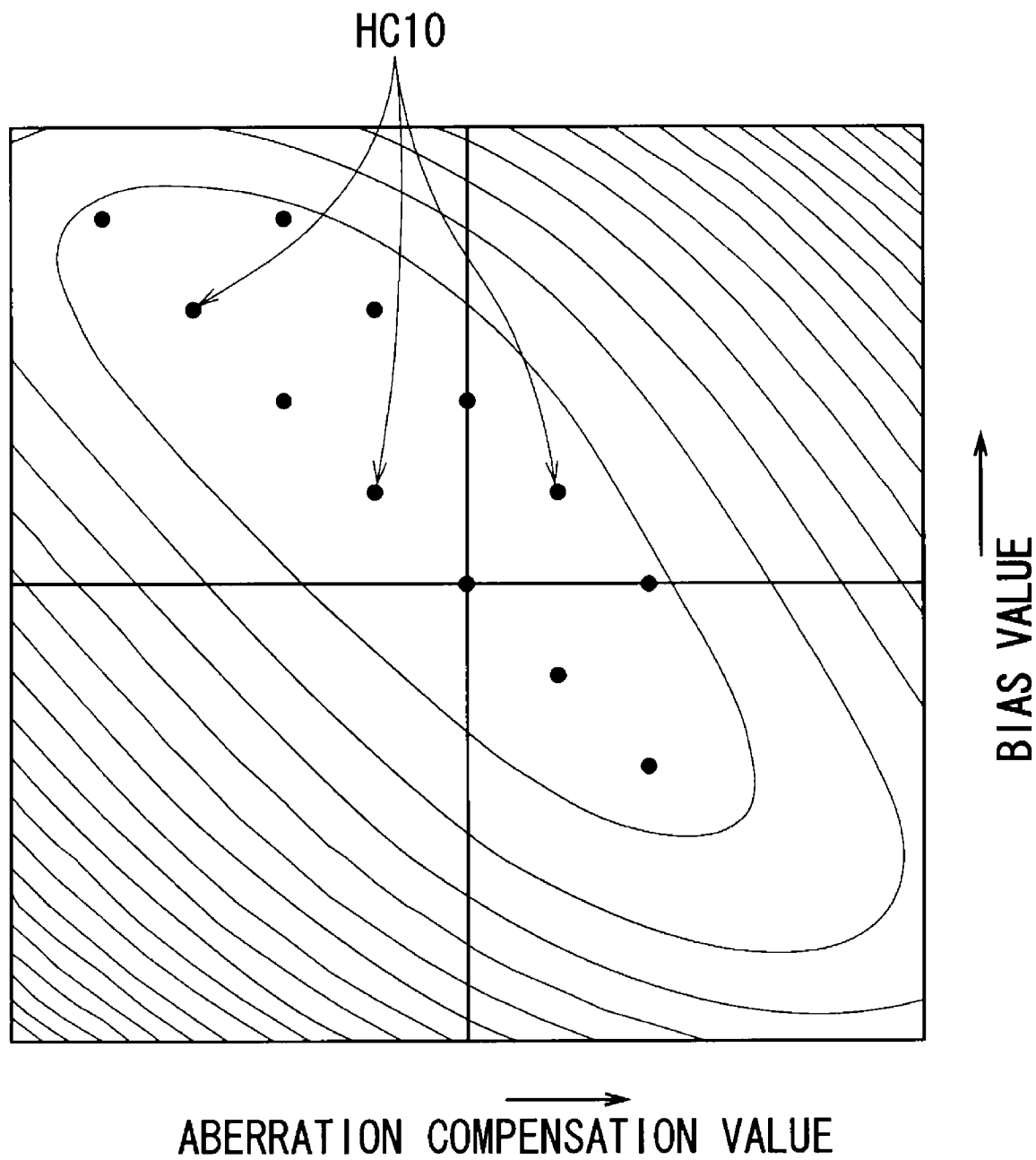
FIG. 9 is a schematic diagram illustrating the calculation of a second index value by a compensation value setting process employing a first setting method.

If the first setting method is applied to the system controller 5, the system controller 5 performs a trial process of correcting the lens' position and the spherical aberration by selectively using the pairs of compensation values HC10 (FIGS. 8 and 9), which might yield the relatively high first and second index values. In this manner, the system controller 5 calculates the first and second index values. The system controller 5 then multiplies the first and second index values as follows:

$$f(X,Y)=X \times Y \quad (1)$$

where the first and second index values are a variable X and a variable Y, respectively. In this manner, the system controller 5 calculates evaluation values of the pairs of compensation values HC10 (i.e. the combination of bias and aberration compensation values) as a result of the trial process. Based on those evaluation values, the system controller 5 picks up, out of the remaining pairs of compensation values (which have not been used for the trail process), those adjacent to the pairs of compensation values HC10 and generate their evaluation values by interpolating.

Figure 10:
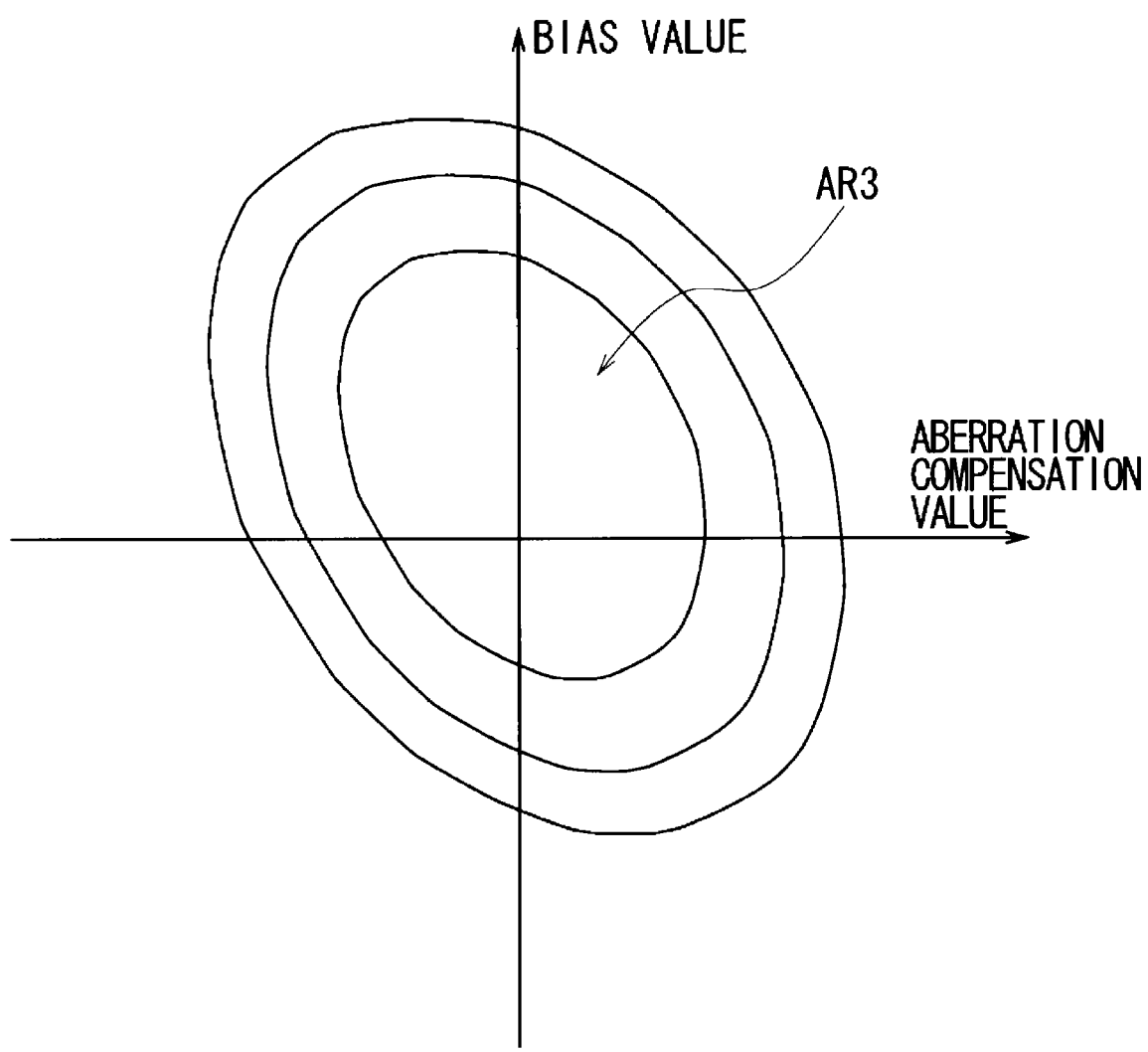
FIG. 10 is a schematic diagram illustrating evaluation value characteristics.

In this case, as shown in FIG. 10 (in which the aberration compensation values are plotted along the horizontal axis and the bias values along the vertical axis), the evaluation values of various pairs of compensation values represent, like the first-index-value characteristics and the first-index-value characteristics combined, the characteristic of the concentric contour lines, each of which has a distorted shape extending in a predetermined direction (which is a direction between the above certain direction and the vertical axis) and narrowing in a direction perpendicular to the predetermined direction.

By the way, although the characteristics of those evaluation values (also referred to as "evaluation value characteristics") are different from the first- and second-index-value characteristics, the innermost contour line is a group of highest evaluation values: The more they go outside, the smaller the evaluation values will be. Within an area AR3 of the innermost contour line (also referred to as "third area"), there exist the pairs of compensation values whose evaluation values are relatively high. The values between the second and third innermost contour lines are smaller: The more they go outside, the smaller the evaluation values will be.

After calculating the evaluation values of those pairs of compensation values, the system controller 5 uses them to find an appropriate pair of compensation values. The following describes how to search for an appropriate pair of compensation values, by using the evaluation value characteristics on the above two-dimensional plane.

Figure 11:
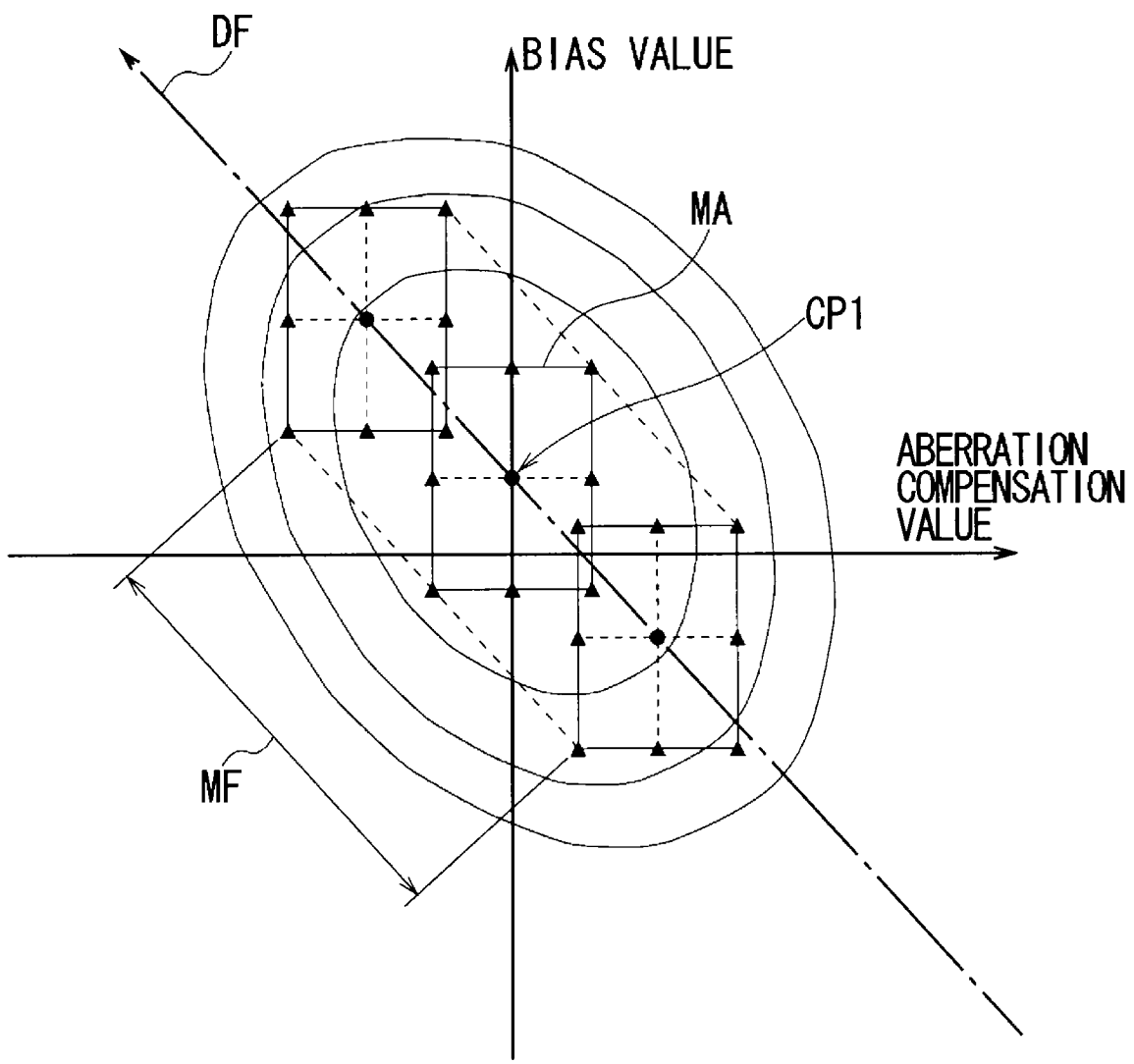
FIG. 11 is a schematic diagram illustrating how to search for appropriate bias and aberration compensation values (1)

As shown in FIG. 11, the system controller 5 selects, out of those pairs of compensation values (those whose evaluation values have been calculated), one pair of compensation values CP1 having the highest evaluation value. The system controller 5 then sets an estimated margin area MA around the pair of compensation values CP1 such that the center of the estimated margin area MA corresponds to the position of the pair of compensation values CP1.

Note that, even if the pair of compensation values of the highest evaluation value is set in the recording and reproducing device 1 for correcting the lens' position and the spherical aberration, the laser beam L1 may not be appropriately focused on the data recording surface of the optical disc 2 by departing from the surface, or the spot of the laser beam L1 on the data recording surface becomes circular, due to the change of temperatures inside the device (which may lead to the change of distances between the optical components of the optical pickup 3), the axial run-out of the optical disc 2, or the like. This may decrease the data writing and reading capabilities of the recording and reproducing device 1 (which means that quality of readout data and waveform-equalized data may drop accordingly) because it is as if the lens' position and the spherical aberration are corrected by the other pair of compensation values adjacent to the pair of compensation values of the highest evaluation value.

If the decrease of the data reading and writing capability is within an allowable range, the recording and reproducing device 1 is able to continue reading and writing data on the data recording surface of the optical disc 2. In other words, the other pair of compensation values, which is different from the pair of compensation values set in the device 1 but actually used for correcting the lens' position and the spherical aberration when the laser beam L1 is out of focus, has a relatively high evaluation value so that the decrease of the data reading and writing capability is within an allowable range: this relatively high evaluation value may be inside the third area AR3. Accordingly, the estimated margin area MA represents a range of the pairs of compensation values, which includes the pair of compensation values set in the device 1 and the other adjacent pairs that can keep the data reading and writing capability within the allowable range.

The estimated margin area MA is, for example, a quadrangle whose one arbitrary-length side is parallel to the horizontal axis and the other arbitrary-length side is parallel to the vertical axis on the two-dimensional plane. The system controller 5 also sets on the two-dimensional plane (on which the evaluation value characteristics are expressed) a first direction DF along which the estimated margin area MA will move and a first motion area MF within which the estimated margin area MA will move along the first direction DF back and forth.

For example, the first direction DF corresponds to a direction along which the contour lines of the evaluation value characteristics are extending slightly. The first motion area MF for example corresponds to the length of the slightly-extended side of the third area AR3.

By the way, as described above, if the recording and reproducing devices 1 have the same configuration of the optical system and circuits and use the same type of optical discs 2, they are able to produce almost the same first- and second-index-value characteristics, thereby generating almost the same evaluation value characteristics from the first- and second-index-value characteristics. Accordingly, the lengths of the one and other sides of the estimated margin area MA, the first direction DF and the first motion area MF can be previously determined from the result of the simulation of the evaluation value characteristics.

That is, the system controller 5 can previously set the lengths of the one and other sides of the estimated margin area MA, the first direction DF and the first motion area MF based on the result of the simulation of the evaluation value characteristics, before searching for an appropriate pair of compensation values by using the evaluation values. Alternatively, the system controller 5 may not run the simulation: In this case, the system controller 5 sets the lengths of the one and other sides of the estimated margin area MA, the first direction DF and the first motion area MF by analyzing the evaluation value characteristics when it calculates the evaluation values.

After setting the estimated margin area MA (whose center is the pair of compensation values CP1), the first direction DF and the first motion range MF, the system controller 5 gradually moves the estimated margin area MA along the first direction DF: The estimated margin area MA moves a predetermined distance each time within the first motion area MF. Each time the estimated margin area MA moves, the system controller 5 detects the evaluation values of the pairs at the eight points: four points on the four corners of the estimated margin area MA and four midpoints of the four sides of the estimated margin area MA, indicated by the triangular marks in the drawing.

Each time it calculates the evaluation values of the pairs at the eight points, the system controller 5 picks up the lowest evaluation value from among the calculated evaluation values and holds it as a representative value. After completing the motion of the estimated margin area MA along the first direction DF, the system controller 5 selects from among those representative values it holds the highest representative value and locates the position of the estimated margin area MA of the selected representative value.

Figure 12:
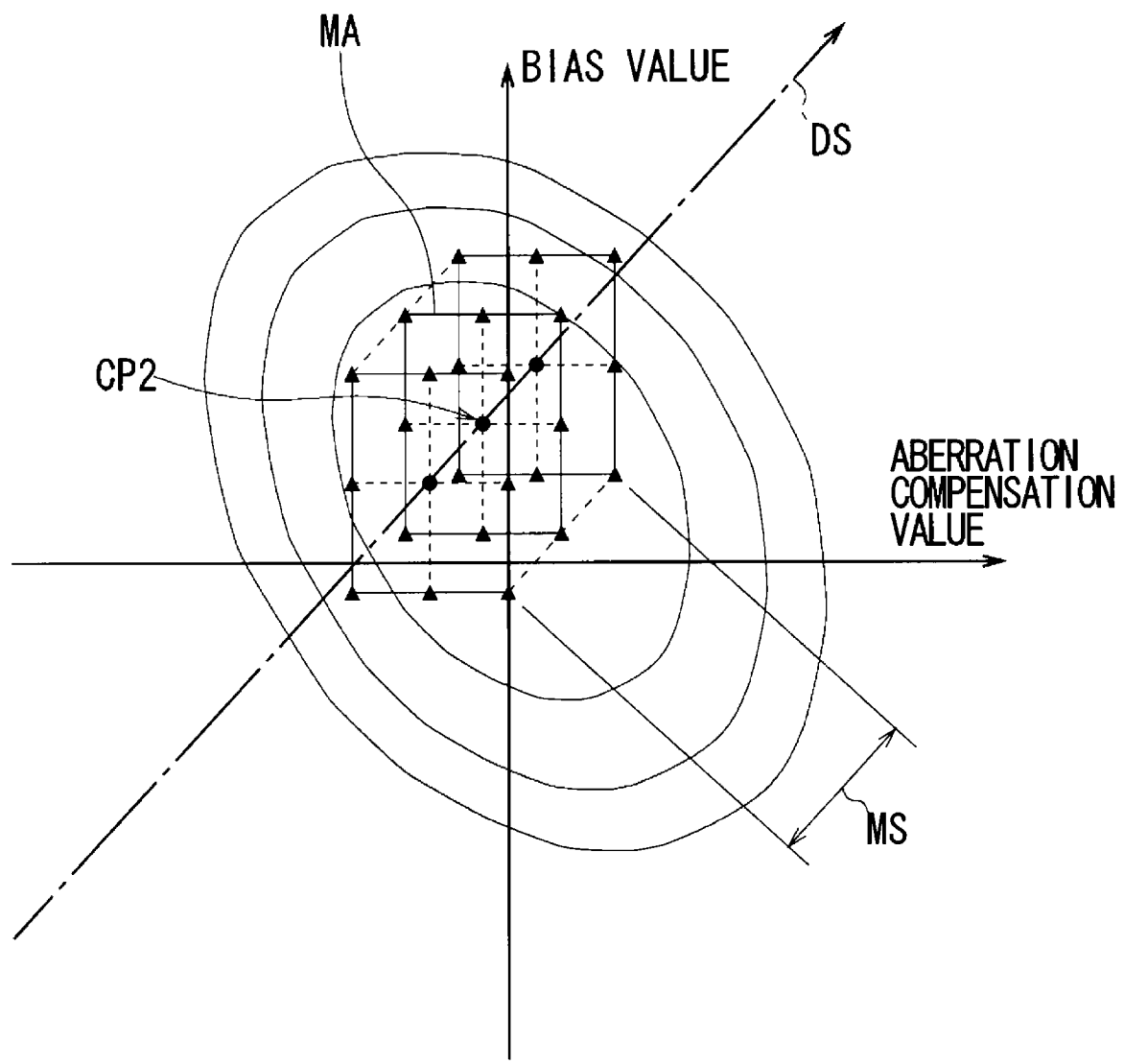
FIG. 12 is a schematic diagram illustrating how to search for appropriate bias and aberration compensation values (2)

As shown in FIG. 12, after locating the position of the estimated margin area MA of the selected representative value, the system controller 5 regards the center of the estimated margin area MA at this position as a starting point CP2. The system controller 5 then sets on the two-dimensional plane (on which the evaluation value characteristics are expressed) a second direction DS along which the estimated margin area MA will move and a second motion area MS within which the estimated margin area MA will move along the second direction DS back and forth.

The second direction DS corresponds to a direction along which the contour lines of the evaluation value characteristics are narrowing slightly. The second motion area MS for example corresponds to the length of the slightly-narrowed side of the third area AR3.

The system controller 5 can set the second direction DS and the second motion area MS based on the result of the simulation of the evaluation value characteristics too. Alternatively, the system controller 5 may not run the simulation: In this case, the system controller 5 sets the second direction DS and the second motion area MS by analyzing the evaluation value characteristics when it calculates the evaluation values.

After setting the second direction DS and the second motion area MS on the two-dimensional plane where the evaluation value characteristics are expressed, the system controller 5 gradually moves the estimated margin area MA, which is at the position of the highest representative value at this time, along the second direction DS: The estimated margin area MA moves a predetermined distance each time within the second motion area MS. Each time the estimated margin area MS moves, the system controller 5 detects the evaluation values of the pairs at the eight points of the estimated margin area MA, indicated by the triangular marks in the drawing.

Each time it calculates the evaluation values of the pairs at the eight points, the system controller 5 picks up the lowest evaluation value from among the calculated evaluation values and holds it as a representative value. After completing the motion of the estimated margin area MA along the second direction DS, the system controller 5 selects from among those representative values it holds the highest representative value and locates the position of the estimated margin area MA of the selected representative value.

Figure 13:
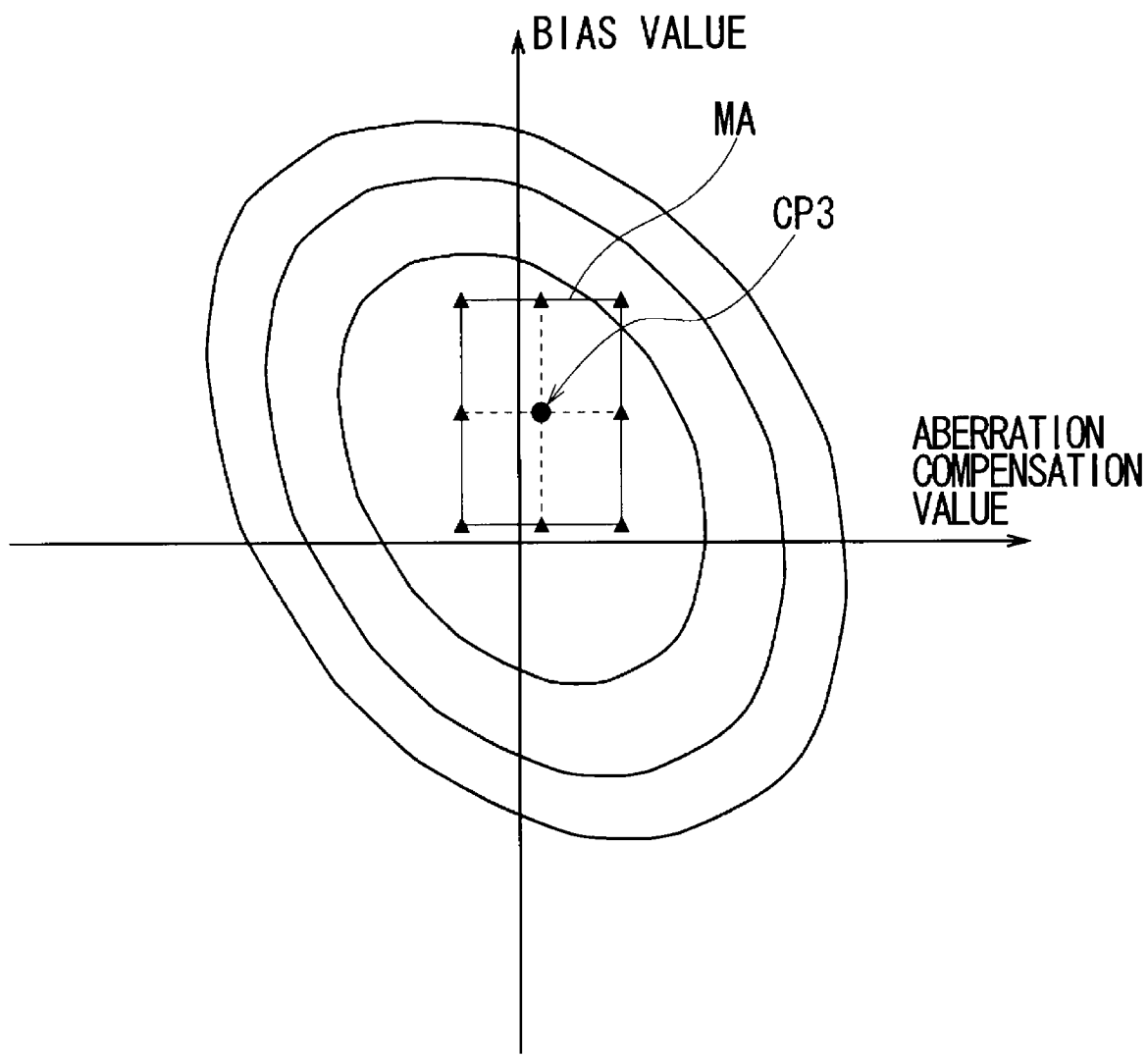
FIG. 13 is a schematic diagram illustrating the setting of bias and aberration compensation values by a compensation value setting process employing a first setting method.

As shown in FIG. 13, after locating the position of the estimated margin area MA of the selected representative value, the system controller 5 recognizes a pair of compensation values (or a combination of bias value and aberration compensation value) at the center CP3 of the located estimated margin area MA and sets it for correcting the lens' position and the spherical aberration in recording and reproducing mode. In this manner, the system controller 5 finds an appropriate pair of compensation values for correcting the lens' position and the spherical aberration.

By performing such a compensation value setting process that employs the first setting method, the system controller 5 can set the appropriate pair of compensation values such that its adjacent pairs of compensation values can also keep the decrease of the data reading and writing capability within the allowable range even if the laser beam L1 is not appropriately focused on the data recording surface of the optical disc 2. That is, even if the data reading and writing capabilities decrease due to the out-of-focus of the laser beam L1 and then the pair of compensation values for correcting the lens' position and the spherical aberration is changed apparently, the system controller 5 can keep the decrease within the allowable range.

Figure 14:
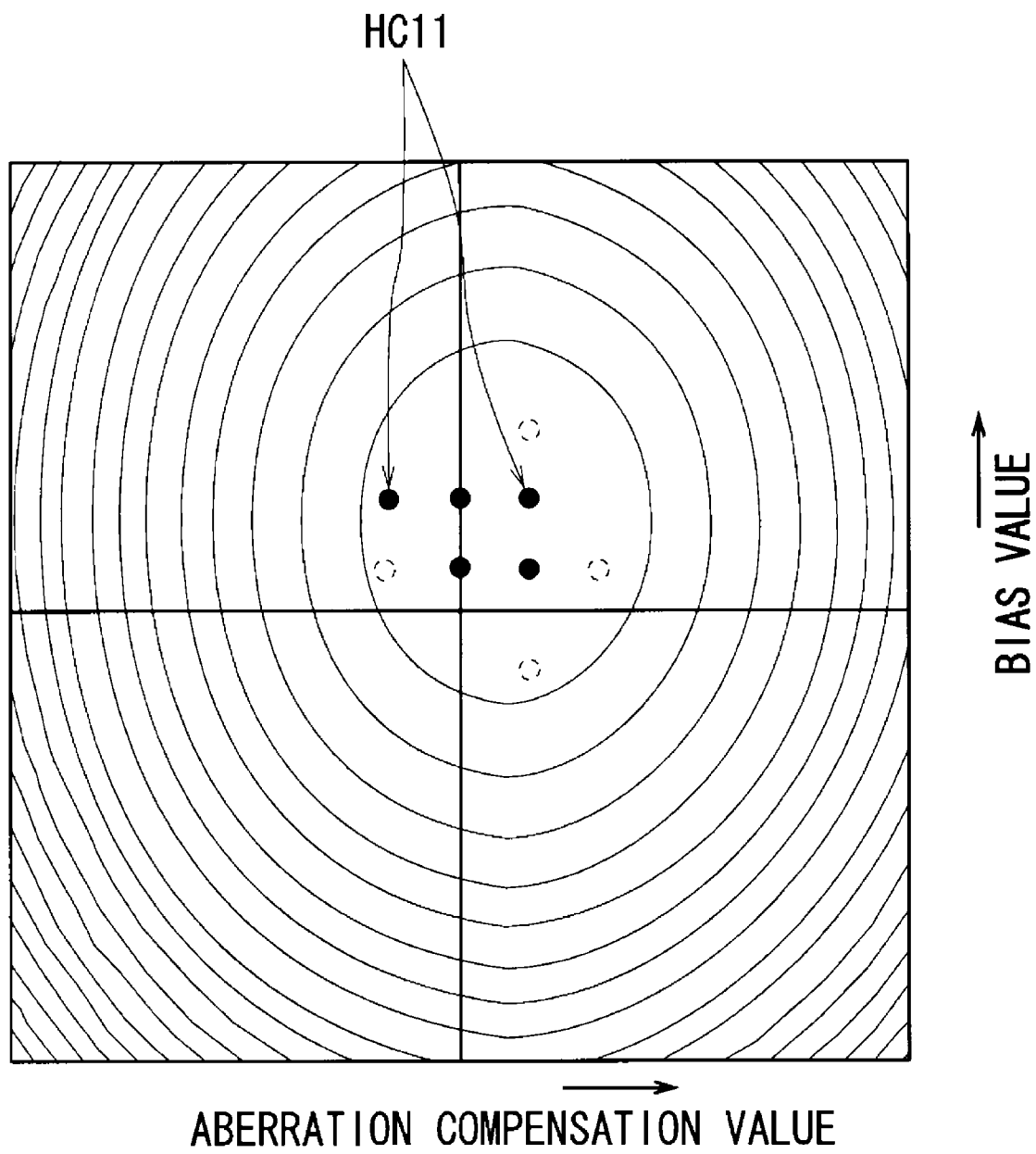
FIG. 14 is a schematic diagram illustrating the selection of setting candidates by a compensation value setting process employing a second setting method.

The following describes the second setting method, with reference to FIG. 14. The system controller 5 that is designed to perform the second setting method of the compensation value setting process selectively uses some of the pairs of compensation values, which might yield the relatively high first index value (like the pairs within the first area AR1 of the first-index-value characteristics), to correct the lens' position and the spherical aberration on trial basis, and calculates the first index values of those pairs of compensation values; and, out of those pairs of compensation values, the system controller 5 select all the pairs of compensation values whose first index values are greater than or equal to a predetermined first threshold as setting candidates HC11 for correcting the lens' position and the spherical aberration.

The first threshold has been set so as to select the pairs of compensation values within the first area AR1 as setting candidates HC11, based on the first index values on the periphery of the first area AR1 (i.e. a group of the maximum first index values on the innermost contour line, as shown in FIG. 6).

Figure 15:
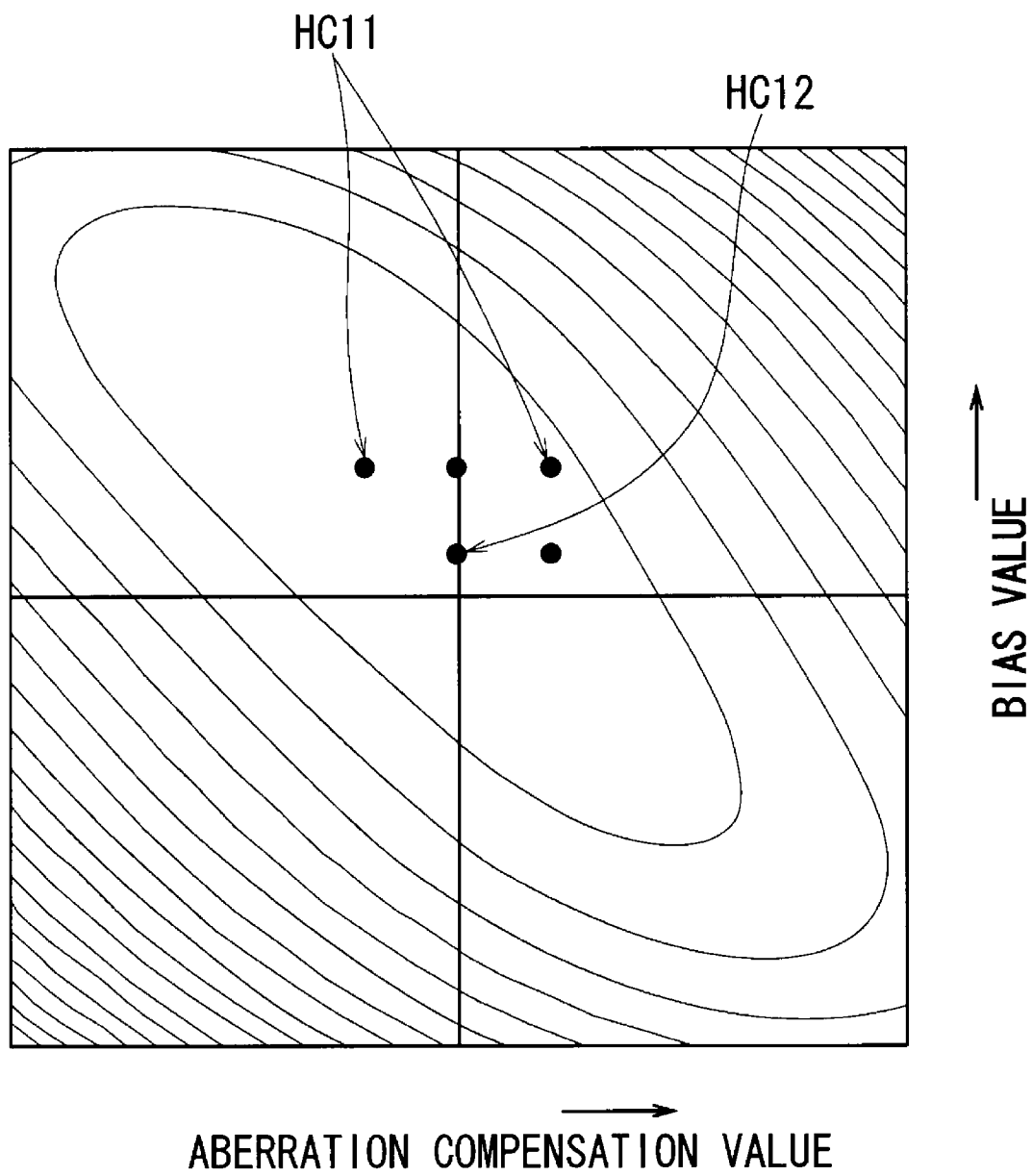
FIG. 15 is a schematic diagram illustrating the setting of bias and aberration compensation values by a compensation value setting process employing a second setting method.

As shown in FIG. 15, the system controller 5 then uses the selected pairs of compensation values HC11 one by one to correct the lens' position and the spherical aberration on trial basis and then calculates the second index values of the pairs of compensation values HC11. Out of those pairs of compensation values HC11, the system controller 5 selects one having the highest second index value, and sets the selected one HC12 for correcting the lens' position and the spherical aberration.

By performing such a compensation value setting process that employs the second setting method, the system controller 5 selects the pairs of compensation values within the first area AR1 as setting candidates HC11; the system controller 5 then selects, out of the setting candidates HC11, the pair of compensation values HC12 having the highest second index value and sets the pair HC12 for correcting the lens' position and the spherical aberration. In this manner, the system controller 5 first selects from the relatively small first area AR1 the pairs of compensation values as setting candidates HC11 and then find out those which are also within the second area AR2 in the process of selecting the pair of compensation values HC12 having the highest second index value.

In that manner, from among numerous pairs of compensation values, the system controller 5 selects the pair of compensation values HC12 which exists inside both the relatively small first area AR1 and the center portion of the second area AR2 for correcting the lens' position and the spherical aberration: The system controller 5 tries to avoid selecting those around the one or other end of the certain direction of the second area AR2 for correcting the lens' position and the spherical aberration.

Figure 16:
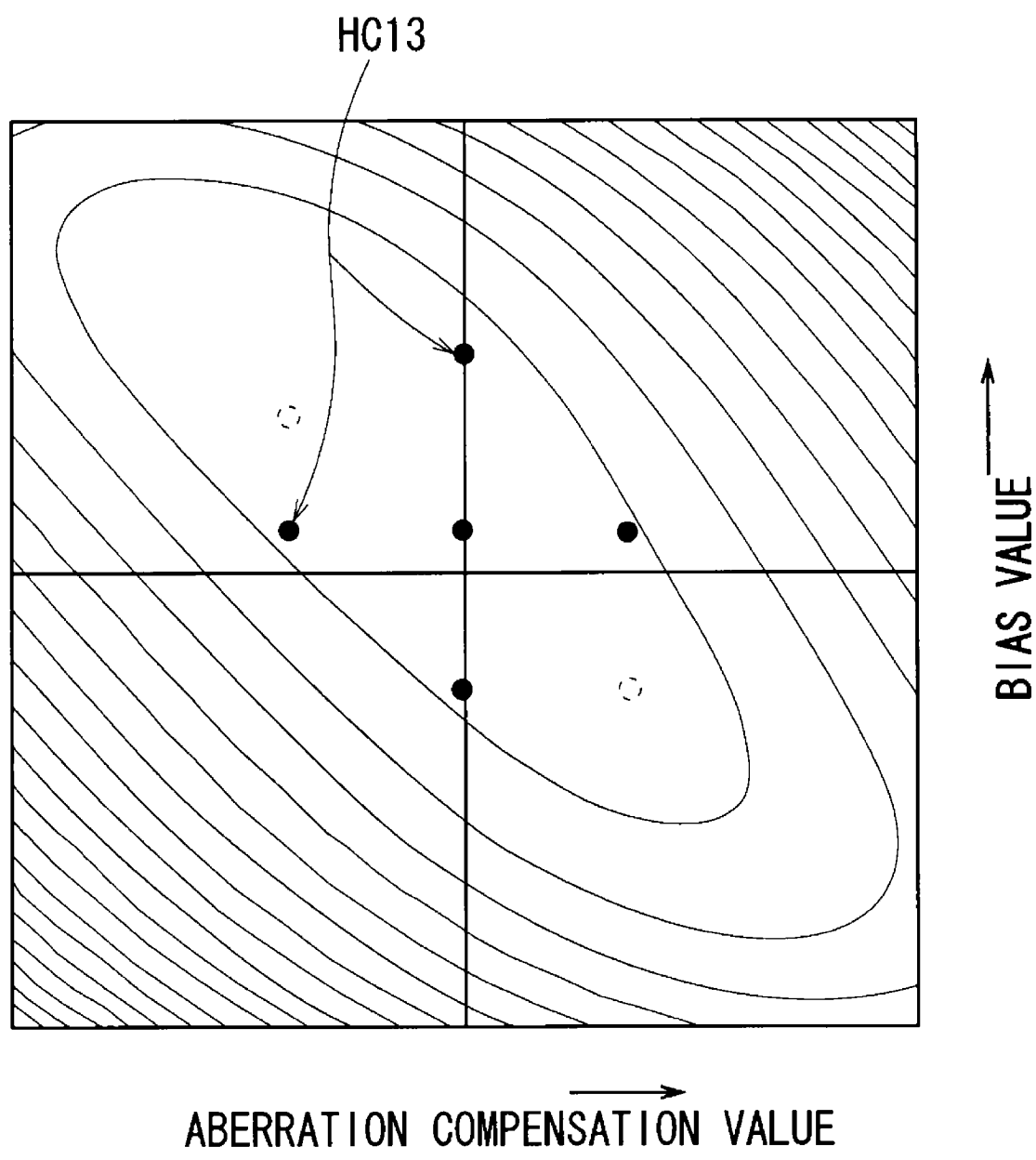
FIG. 16 is a schematic diagram illustrating the selection of setting candidates by a compensation value setting process employing a third setting method.

The following describes the third setting method, with reference to FIG. 16. The system controller 5 that is designed to perform the third setting method of the compensation value setting process selectively uses some of the pairs of compensation values, which might yield the relatively high second index value (like the pairs within the second area AR2 of the second-index-value characteristics), to correct the lens' position and the spherical aberration on trial basis, and calculates the second index values of those pairs of compensation values; and, out of those pairs of compensation values, the system controller 5 select all the pairs of compensation values whose second index values are greater than or equal to a predetermined second threshold as setting candidates HC13 for correcting the lens' position and the spherical aberration.

The second threshold has been set so as to select the pairs of compensation values within the second area AR2 as setting candidates HC13, based on the second index values on the periphery of the second area AR2 (i.e. a group of the maximum second index values on the innermost contour line, as shown in FIG. 7). Accordingly, even if the failure of the calculation of the second index values cause errors in the second index values, the system controller 5 can select not only the pairs of compensation values around the one or other end of the certain direction of the second area AR2 but also those around the center of the second area AR2 as setting candidates HC13.

Figure 17:
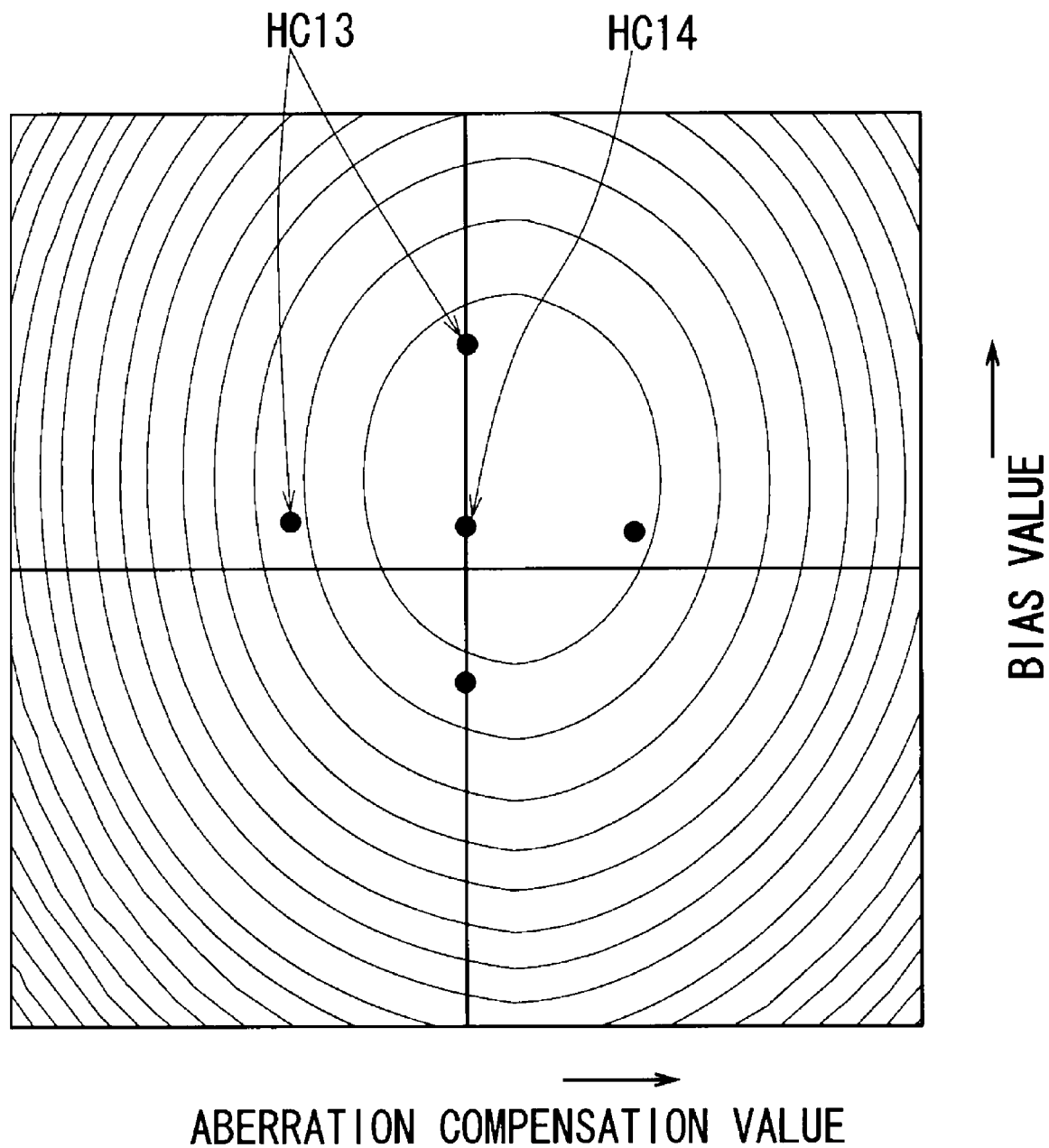
FIG. 17 is a schematic diagram illustrating the setting of bias and aberration compensation values by a compensation value setting process employing a third setting method.

As shown in FIG. 17, the system controller 5 then uses the selected pairs of compensation values HC13 one by one to correct the lens' position and the spherical aberration on trial basis and then calculates the first index values of the pairs of compensation values HC13. Out of those pairs of compensation values HC13, the system controller 5 selects one having the highest first index value, and sets the selected one HC14 for correcting the lens' position and the spherical aberration.

By performing such a compensation value setting process that employs the third setting method, the system controller 5 selects the pairs of compensation values within the second area AR2 as setting candidates HC13; the system controller 5 then selects, out of the setting candidates HC13, the pair of compensation values HC12 having the highest first index value and sets the pair HC14 for correcting the lens' position and the spherical aberration. In this manner, the system controller 5 first selects from the relatively large second area AR2 the pairs of compensation values as setting candidates HC13 and then find out those which are also within the first area AR1 in the process of selecting the pair of compensation values HC14 having the highest first index value.

In that manner, from among numerous pairs of compensation values, the system controller 5 selects the pair of compensation values HC14 which exists inside both the relatively small first area AR1 and the center portion of the second area AR2 for correcting the lens' position and the spherical aberration: Even if the failure of the calculation of the second index values cause errors in the second index values, the system controller 5 tries to avoid selecting the pairs of compensation values HC13 around the one or other end of the certain direction of the second area AR2 for correcting the lens' position and the spherical aberration.

Figure 18:
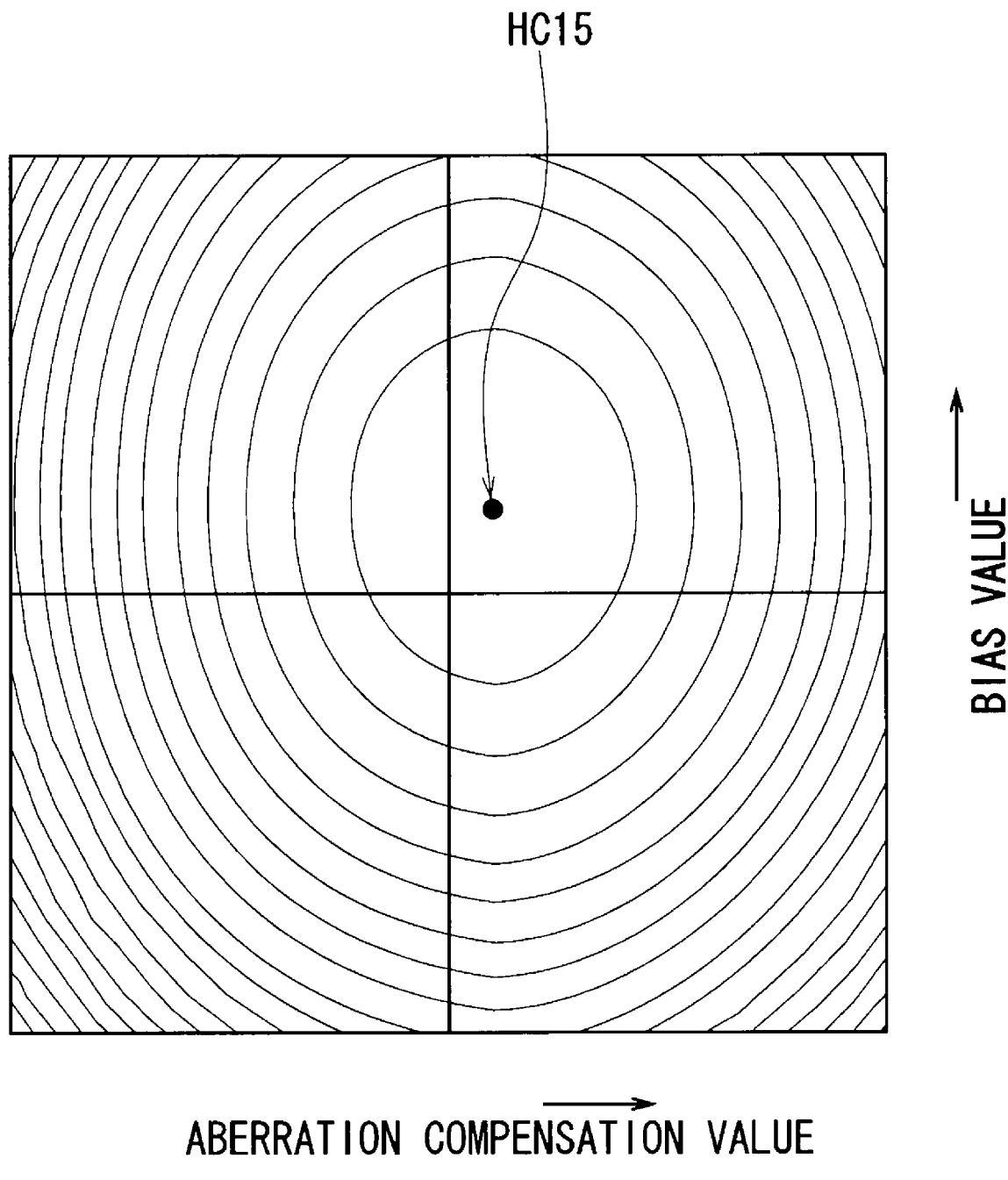
FIG. 18 is a schematic diagram illustrating the detection of the bias and aberration compensation values of the highest first index value.

The following describes the fourth setting method, with reference to FIG. 18. The system controller 5 that is designed to perform the fourth setting method of the compensation value setting process selectively uses some of the pairs of compensation values, which might yield the relatively high first index value (like the pairs within the first area AR1 of the first-index-value characteristics), to correct the lens' position and the spherical aberration on trial basis, and calculates the first index values of those pairs of compensation values; and, out of those pairs of compensation values, the system controller 5 select one having the highest first index value as a pair of first setting usage compensation values HC15.

Figure 19:
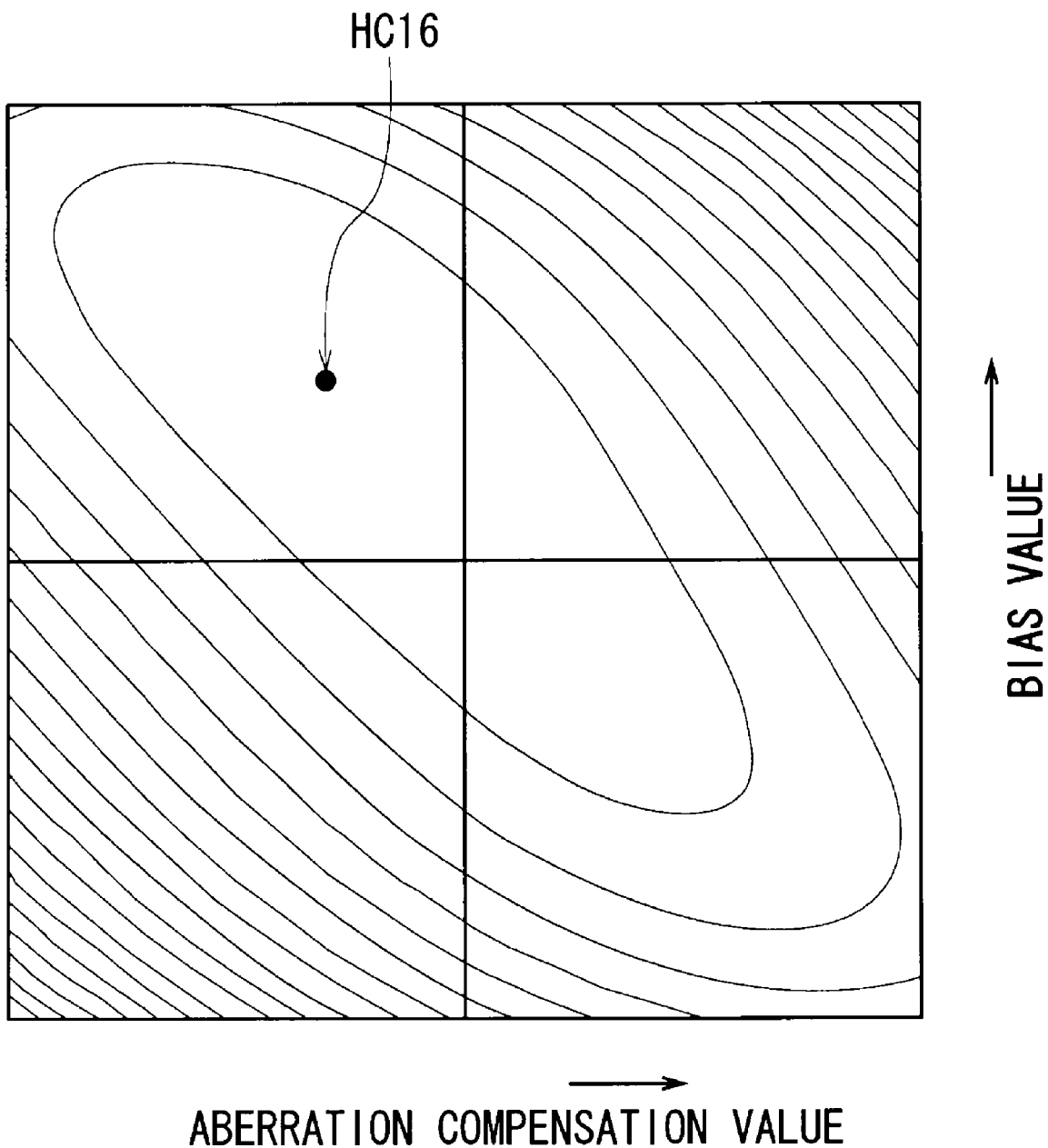
FIG. 19 is a schematic diagram illustrating the detection of the bias and aberration compensation values of the highest second index value.

In addition, as shown in FIG. 19, the system controller 5 selectively uses some of the pairs of compensation values, which might yield the relatively high second index value (like the pairs within the second area AR2 of the second-index-value characteristics), to correct the lens' position and the spherical aberration on trial basis, and calculates the second index values of those pairs of compensation values; and, out of those pairs of compensation values, the system controller 5 select one having the highest second index value as a pair of second setting usage compensation values HC16.

Figure 20:
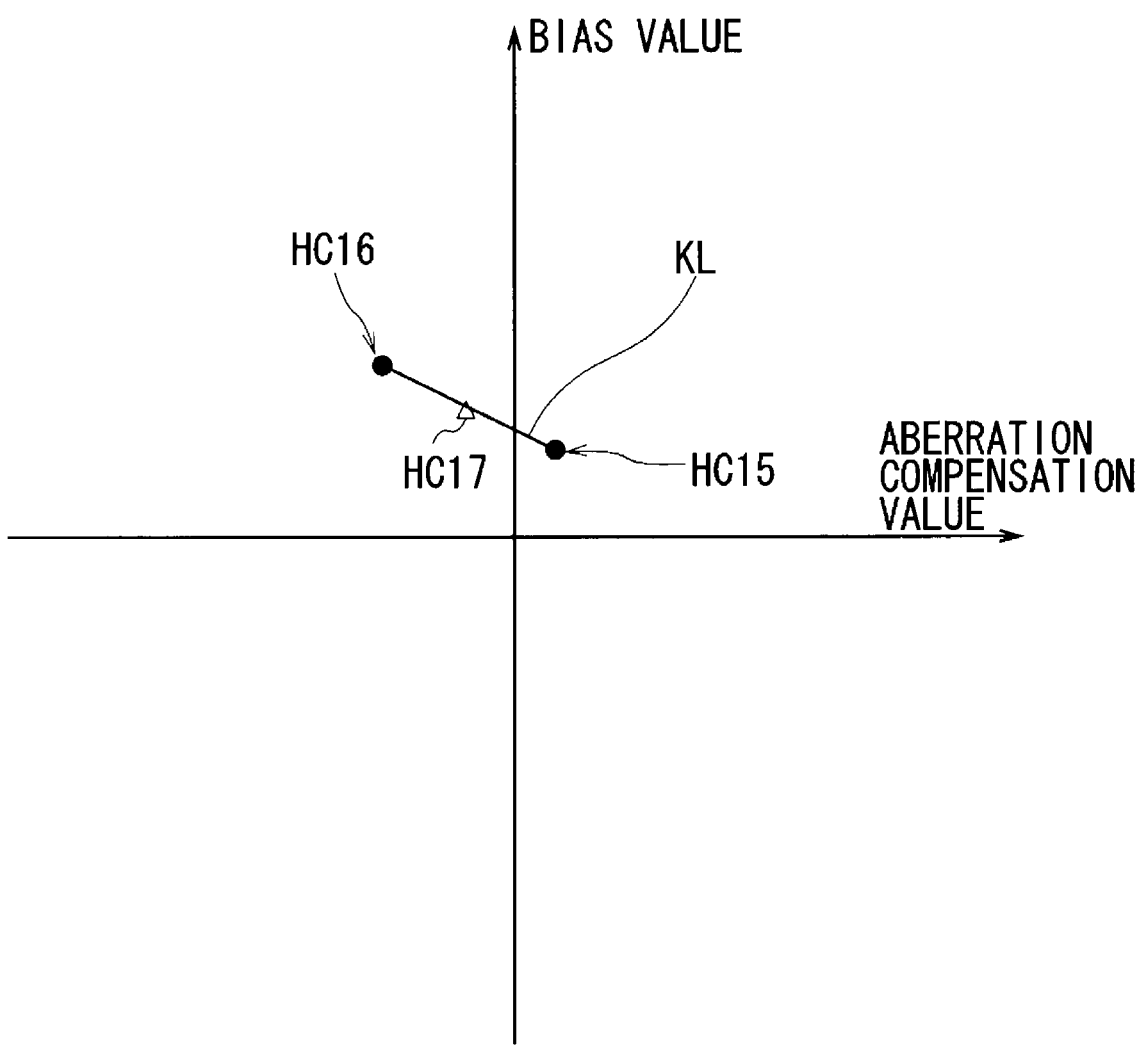
FIG. 20 is a schematic diagram illustrating the setting of bias and aberration compensation values by a compensation value setting process employing a fourth setting method.

Considering the pair of first setting usage compensation values HC15 and the pair of second setting usage compensation values HC16 (the combinations of bias values and aberration compensation values HC15 and HC16) on the two-dimensional graph as shown in FIG. 20, the system controller 5 calculates a pair of compensation values HC17 for correcting the lens' position and the spherical position as follows:

$$HC17 = \alpha HC15 + \beta HC16 \qquad (2)$$

($\alpha \geq 0$, $\beta \geq 0$ and $\alpha + \beta = 1$)

This means that the pair HC17 is at a given position on a imaginary line KL that connects the pair HC15 to the pair HC16 on the two-dimensional graph. The system controller 5 sets the pair of compensation values HC17 for correcting the lens' position and the spherical position.

Incidentally, the coefficients $\alpha$ and $\beta$ of the equation (2) are determined according to the accuracy of the calculation of the second index values and the precision of the measurement of the jitter components of the readout data (from which the first index values are calculated). Based on the coefficients $\alpha$ and $\beta$, the system controller 5 calculates the pair of compensation values HC17 (which is for example at a midpoint between the pair HC15 and the pair HC16) for correcting the lens' position and the spherical position.

Even if the failure of the calculation of the second index values causes errors and therefore the pair of setting usage compensation values HC16 is near the one or other end of the certain direction of the second area AR2, the coefficients α and β help the system controller 5 to choose a pair of compensation values HC17 situated near the pair HC15 with respect to the pair HC16 (i.e. near the center of the second area AR2) for correcting the lens' position and the spherical position.

By performing such a compensation value setting process that employs the fourth setting method, the system controller 5 selects the pair of compensation values HC17 that exists between the pair of first setting usage compensation values HC15 and the pair of second setting usage compensation values HC16 for correcting the lens' position and the spherical position: The pair of first setting usage compensation values HC15 is inside the first area AR1 of the first-index-value characteristics and the pair of second setting usage compensation values HC16 inside the second area AR2 of the second-index-value characteristics.

In that manner, even if the pair of second setting usage compensation values HC16 tends to be close to the one or other end of the certain direction of the second area AR2, the system controller 5 chooses the pair of compensation values HC17 based on the position of the pair of first setting usage compensation values HC15 such that the pair HC17 becomes close to the center of the second area AR2. This means that the system controller 5 tries to avoid selecting the pairs of compensation values around the one or other end of the certain direction of the second area AR2 for correcting the lens' position and the spherical aberration.

Figure 21:
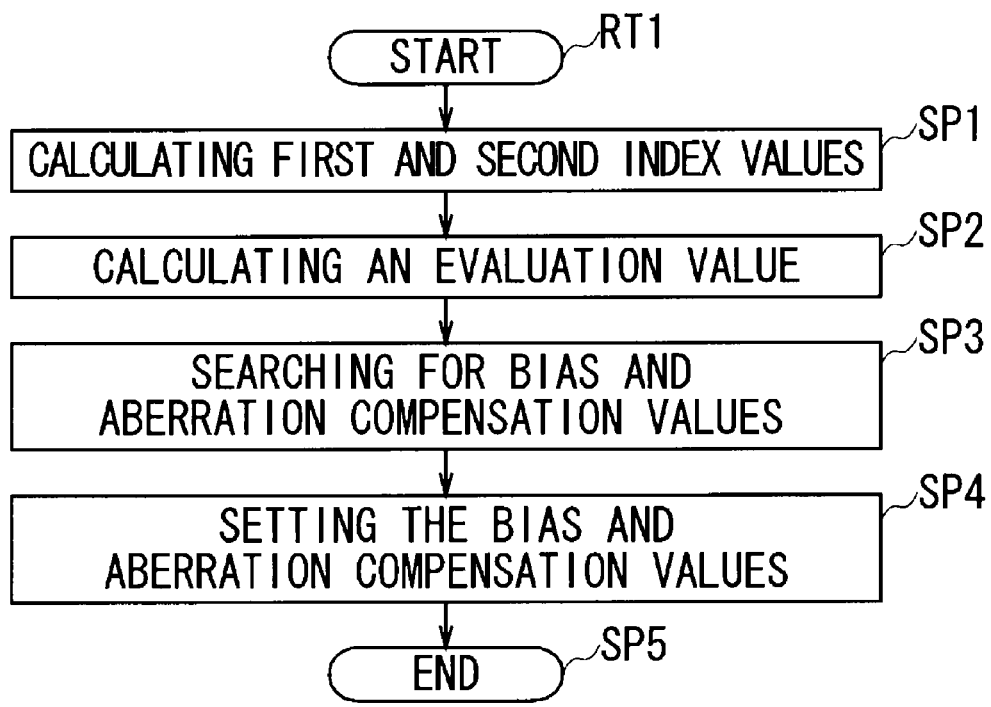
FIG. 21 is a flowchart illustrating the procedure of a first compensation value setting process.

FIG. 21 is a flowchart illustrating a procedure RT1 of a first compensation value setting process that employs the first setting method. When it starts operating in startup mode to be able to detect the disc address information or the position of the spot of the laser beam L1 on the data recording surface of the optical disc 2, the system controller 5 starts the procedure RT1 and proceeds to step SP1. At step SP1, the system controller 5 selectively uses some of the pairs of compensation values HC10, which might yield the relatively high first and second index values, to correct the lens' position and the spherical aberration on trial basis and calculates the first and second index values. The system controller 5 subsequently proceeds to step SP2.

At step SP2, the system controller 5 multiplies the first and second index values of each pair of compensation values HC10, calculates an evaluation value of each pair of compensation values HC10 as a result of the trial process of correcting the lens' position and the spherical aberration, and then proceeds to step SP3. At step SP3, as described in FIGS. 11 to 13, the system controller 5 uses the evaluation values to search for an appropriate pair of compensation values, and then proceeds to next step SP4. At step SP4, the system controller 5 sets the appropriate pair of compensation values for correcting the lens' position and the spherical aberration, and then proceeds to step SP5 to end the procedure RT1.

Figure 22:
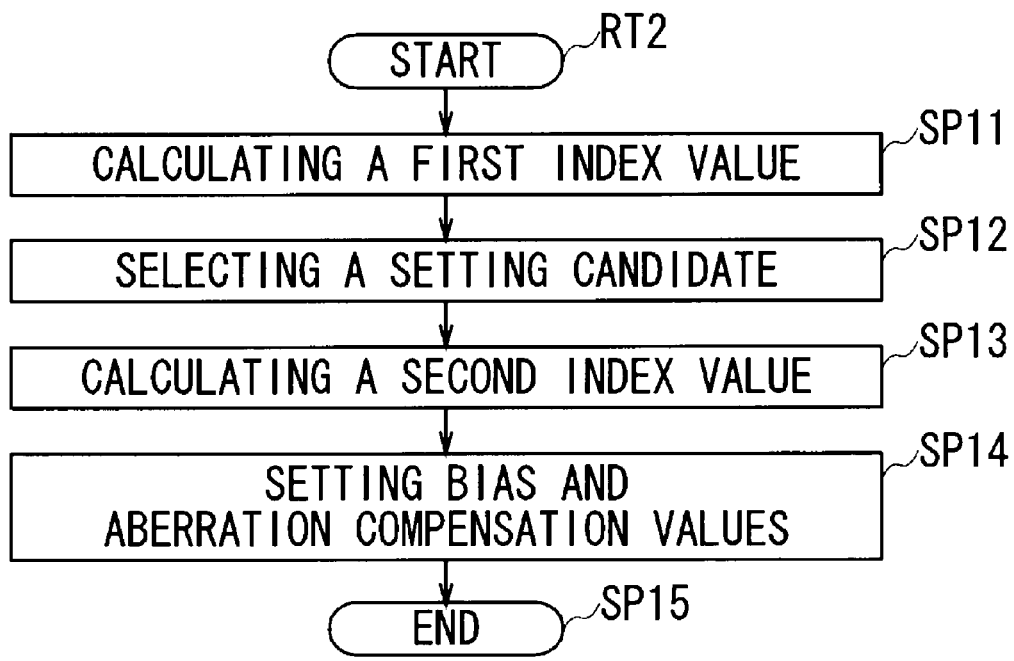
FIG. 22 is a flowchart illustrating the procedure of a second compensation value setting process.

FIG. 22 is a flowchart illustrating a procedure RT2 of a second compensation value setting process that employs the second setting method. When it starts operating in startup mode to be able to detect the disc address information or the position of the spot of the laser beam L1 on the data recording surface of the optical disc 2, the system controller 5 starts the procedure RT2 and proceeds to step SP11. At step SP11, the system controller 5 selectively uses some of the pairs of compensation values, which might yield the relatively high first index values (i.e. those within the first area AR1 of the first-index-value characteristics), to correct the lens' position and the spherical aberration on trial basis and calculates the first index values of those pairs of compensation values. The system controller 5 subsequently proceeds to step SP12.

At step SP12, the system controller 5 selects, from among those used for correcting the lens' position and the spherical aberration on trial basis, all the pairs of compensation values whose first index values are greater than or equal to the first threshold as setting candidates HC11, and then proceeds to step SP13. At step SP13, the system controller 5 uses those pairs of compensation values HC11 one after another for correcting the lens' position and the spherical aberration on trial basis, calculates the second index value of each pair of compensation values HC11, and then proceeds to step SP14. At step SP14, the system controller 5 selects a pair of compensation values HC12 whose second index value is the highest of all among from the setting candidates or the pairs of compensation values HC11, sets the selected pair of compensation value HC12 for correcting the lens' position and the spherical aberration, and then proceeds to step SP15 to end the procedure RT2.

Figure 23:
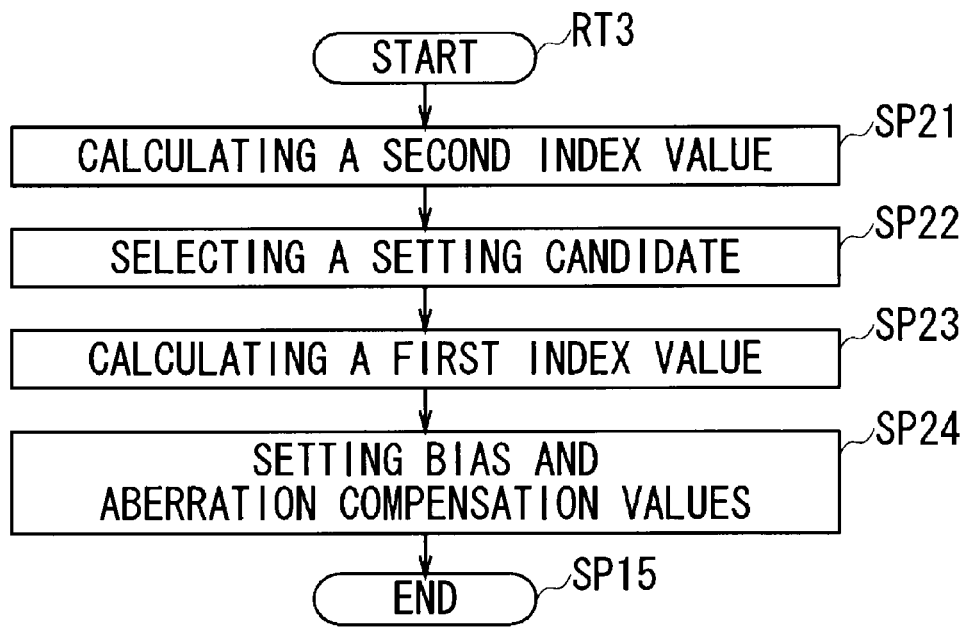
FIG. 23 is a flowchart illustrating the procedure of a third compensation value setting process.

FIG. 23 is a flowchart illustrating a procedure RT3 of a third compensation value setting process that employs the third setting method. When it starts operating in startup mode to be able to detect the disc address information or the position of the spot of the laser beam L1 on the data recording surface of the optical disc 2, the system controller 5 starts the procedure RT3 and proceeds to step SP21. At step SP21, the system controller 5 selectively uses some of the pairs of compensation values, which might yield the relatively high second index values (i.e. those within the second area AR2 of the second-index-value characteristics), to correct the lens' position and the spherical aberration on trial basis and calculates the second index values of those pairs of compensation values. The system controller 5 subsequently proceeds to step SP22.

At step SP22, the system controller 5 selects, from among those used for correcting the lens' position and the spherical aberration on trial basis, all the pairs of compensation values whose second index values are greater than or equal to the second threshold as setting candidates HC13, and then proceeds to step SP23. At step SP23, the system controller 5 uses those pairs of compensation values HC13 one after another for correcting the lens' position and the spherical aberration on trial basis, calculates the first index value of each pair of compensation values HC13, and then proceeds to step SP24. At step SP24, the system controller 5 selects a pair of compensation values HC14 whose first index value is the highest of all among from the setting candidates or the pairs of compensation values HC13, sets the selected pair of compensation value HC14 for correcting the lens' position and the spherical aberration, and then proceeds to step SP25 to end the procedure RT3.

Figure 24:
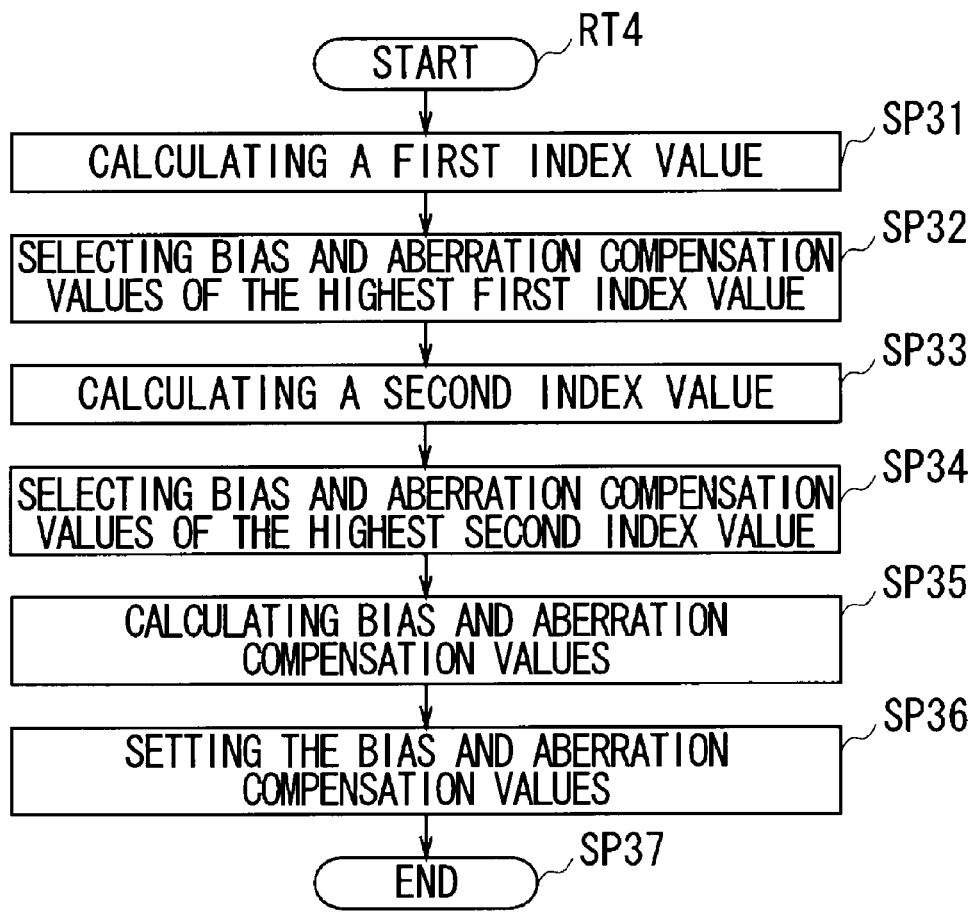
FIG. 24 is a flowchart illustrating the procedure of a fourth compensation value setting process.

FIG. 24 is a flowchart illustrating a procedure RT4 of a fourth compensation value setting process that employs the fourth setting method. When it starts operating in startup mode to be able to detect the disc address information or the position of the spot of the laser beam L1 on the data recording surface of the optical disc 2, the system controller 5 starts the procedure RT4 and proceeds to step SP31. At step SP31, the system controller 5 selectively uses some of the pairs of compensation values, which might yield the relatively high first index values (i.e. those within the first area AR1 of the first-index-value characteristics), to correct the lens' position and the spherical aberration on trial basis and calculates the first index values of those pairs of compensation values. The system controller 5 subsequently proceeds to step SP32.

At step SP32, the system controller 5 selects, from among those used for correcting the lens' position and the spherical aberration on trial basis, the pair of compensation values whose first index value is the highest of all as a pair of first setting usage compensation values HC15, and then proceeds to step SP33. At step SP33, the system controller 5 selectively uses some of the pairs of compensation values, which might yield the relatively high second index values (i.e. those within the second area AR2 of the second-index-value characteristics), to correct the lens' position and the spherical aberration on trial basis and calculates the second index values of those pairs of compensation values. The system controller 5 subsequently proceeds to step SP34. At step SP34, the system controller 5 selects, from among those used for correcting the lens' position and the spherical aberration on trial basis, the pair of compensation values whose second index value is the highest of all as a pair of second setting usage compensation values HC16, and then proceeds to step SP35.

At step SP35, the system controller 5 finds out a pair of compensation values HC17, which is at a given point on the imaginary line KL that connects the pair of first setting usage compensation values HC15 and the pair of second setting usage compensation values HC16, and then proceeds to step SP36. At step SP36, the system controller 5 sets the calculated pair of compensation values HC17 for correcting the lens' position and the spherical aberration, and then proceeds to step SP37 to end the procedure RT4.

As described above, while selectively using some of the pairs of compensation values, which might yield the relatively high first and second index values, for correcting the lens' position and the spherical aberration on trial basis, the recording and reproducing device 1 in startup mode calculates the first index values representing the evaluations of those pairs of compensation values used for the trial process, based on the readout data generated before the process of the waveform equalizer 53 of the PRML processing section 52. In addition, the recording and reproducing device 1 calculates the second index values representing the evaluations of those pairs of compensation values used for the trial process, based on the waveform-equalized data generated by the waveform equalizer 53 at this time: The characteristic of the second index values is different from that of the first index values.

Based on the calculated first and second index values, the recording and reproducing device 1 selects the pair of compensation values whose first and second index values are relatively high, and sets the selected pair for correcting the lens' position and the spherical aberration.

In this manner, the recording and reproducing device 1 acquires the first and second index values, which have different characteristics, from the readout data and the waveform-equalized data and then limits the number of setting candidates (or the pairs of compensation values) based on the first and second index values.

According to the above configuration, each time it selects a different pair of compensation values and performs the trial process of correcting the lens' position and the spherical aberration with the selected pair, the recording and reproducing device 1 calculates the first index value representing the evaluation of the selected pair from the readout data generated before the process of the waveform equalizer 53 and the second index value representing the evaluation of the selected pair from the waveform-equalized data generated by the waveform equalizer 53. Based on the calculated first and second index values, the recording and reproducing device 1 selects a pair of compensation values and sets it for correcting the lens' position and the spherical aberration. In this manner, the recording and reproducing device 1 limits the number of setting candidates (or the pairs of compensation values) based on the first and second index values, which have different characteristics. Thus, the recording and reproducing device 1 can appropriately set the pair of compensation values.

Moreover, the recording and reproducing device 1, which is designed to perform the compensation value setting process of the above first setting method, calculates the evaluation values of the pairs of compensation values by using the first and second index values of those pairs as variables, finds an appropriate pair of compensation values by using the evaluation values and the estimated margin area MA, and sets it for correcting the lens' position and the spherical aberration. Accordingly, the recording and reproducing device 1 can set the pair of compensation values for correcting the lens' position and the spherical aberration such that its adjacent pairs can also keep the decrease of the data reading and writing capabilities within the allowable range even if the laser beam L1 is not appropriately focused on the data recording surface of the optical disc 2. That is, even if the data reading and writing capabilities decrease due to the out-of-focus of the laser beam L1 and the pair of compensation values for correcting the lens' position and the spherical aberration is changed apparently to the adjacent one, the recording and reproducing device 1 can keep the decrease within the allowable range.

Furthermore, the recording and reproducing device 1, which is designed to perform the compensation value setting process of the above second setting method, selects the pairs of compensation values as setting candidates based on the first index values of the first-index-value characteristics, selects one pair of compensation values from among the setting candidates based on the second index values of the second-index-value characteristics, and sets it for correcting the lens' position and the spherical aberration. In this manner, the recording and reproducing device 1 selects the pair of compensation values that is inside both the relatively narrow first area ARE and the center section of the relatively wide second area AR2 for correcting the lens' position and the spherical aberration: The recording and reproducing device 1 tries to avoid selecting the pairs of compensation values around the one or other end of the certain direction of the second area AR2 for correcting the lens' position and the spherical aberration.

Furthermore, the recording and reproducing device 1, which is designed to perform the compensation value setting process of the above third setting method, selects the pairs of compensation values as setting candidates based on the second index values of the second-index-value characteristics, selects one pair of compensation values from among the setting candidates based on the first index values of the first-index-value characteristics, and sets it for correcting the lens' position and the spherical aberration. In this manner, the recording and reproducing device 1 selects the pair of compensation values that is inside both the relatively narrow first area AR1 and the center section of the relatively wide second area AR2 for correcting the lens' position and the spherical aberration: Even if the failure of the calculation of the second index values cause errors in the second index values, the recording and reproducing device 1 tries to avoid selecting the pairs of compensation values around the one or other end of the certain direction of the second area AR2 for correcting the lens' position and the spherical aberration.

Furthermore, the recording and reproducing device 1, which is designed to perform the compensation value setting process of the above fourth setting method, selects one pair of compensation values as a pair of first setting usage compensation values based on the first index values. In addition, the recording and reproducing device 1 selects one pair of compensation values as a pair of second setting usage compensation values based on the second index values. Considering the pair of first setting usage compensation values and the pair of second setting usage compensation values on the two-dimensional graph, the recording and reproducing device 1 finds out the pair of compensation values at a given position on the imaginary line KL connecting the pair of first setting usage compensation values and the pair of second setting usage compensation values, and sets it for correcting the lens' position and the spherical aberration. In this manner, even if the pair of second setting usage compensation values tends to be close to the one or other end of the certain direction of the second area AR2, the recording and reproducing device 1 selects the pair of compensation values based on the position of the pair of first setting usage compensation values such that the selected pair becomes close to the center of the second area AR2.

Incidentally, in the above-noted embodiment, the compensation value setting process of the first setting method calculates an evaluation value by multiplying the first and second index values of each pair of compensation values used for the trial process of correcting the lens' position and the spherical aberration. However the present invention is not limited to this. The evaluation value may be calculated by adding the first and second index values, subtracting the first index value from the second index value or the second index value from the first index value, dividing the first index value by the second index value or the second index value by the first index value, or the like.

Moreover, in the above-noted embodiment, after calculating an evaluation value by multiplying the first and second index values of each pair of compensation values used for the trial process of correcting the lens' position and the spherical aberration, the compensation value setting process of the first setting method uses the calculated evaluation value and the estimated margin area MA to search for a pair of compensation values. However the present invention is not limited to this. The compensation value setting process may calculate an evaluation value in one of the following manners: by adding the first and second index values; by subtracting the first index value from the second index value or the second index value from the first index value; or by dividing the first index value by the second index value or the second index value by the first index value. And the compensation value setting process may choose the pair of compensation values of the highest evaluation value for correcting the lens' position and the spherical aberration.

Furthermore, in the above-noted embodiment, the compensation value setting process of the first setting method calculates an evaluation value by multiplying the first and second index values of each pair of compensation values used for the trial process of correcting the lens' position and the spherical aberration. Based on the calculated evaluation values, the compensation value setting process also calculates, by performing the interpolation process, an evaluation value of the pair of compensation values which is adjacent to the pair of compensation values used for the trial process. The compensation value setting process then searches for a pair of compensation value for correcting the lens' position and the spherical aberration. However the present invention is not limited to this. For example, after calculating an evaluation value by multiplying the first and second index values of each pair of compensation values used for the trial process, the compensation value setting process may calculate, by performing the interpolation process, other evaluation values (i.e. those of the pairs of compensation values at the eight points on the periphery of the estimated margin area) to search for a pair of compensation values while searching for it. This reduces the number of evaluation values it has to calculate to search for a pair of compensation values.

Furthermore, in the above-noted embodiment, while calculating the evaluation values of the pairs of compensation values at the eight points on the periphery of the estimated margin area (its four corners and the four midpoints of the sides), the compensation value setting process of the first setting method searches for a pair of compensation values. However the present invention is not limited to this. Instead, the compensation value setting process may only calculate the evaluation values of the pairs of compensation values at the four points on the periphery of the estimated margin area (its four corners or the four midpoints of the sides).

Furthermore, in the above-noted embodiment, the compensation value setting process of the first setting method calculates an evaluation value by multiplying the first and second index values of each pair of compensation values used for the trial process of correcting the lens' position and the spherical aberration. Based on the calculated evaluation values, the compensation value setting process also calculates, by performing the interpolation process, an evaluation value of the pair of compensation values which is adjacent to the pair of compensation values used for the trial process. The compensation value setting process then searches for a pair of compensation value for correcting the lens' position and the spherical aberration. However the present invention is not limited to this. Alternatively, the compensation value setting process may calculate the evaluation values of the pairs of compensation values at predetermined nine points (on the two-dimensional graph) by multiplying the first and second index values and then approximately calculate the evaluation values of all the other pairs of compensation values on the two-dimensional graph; the compensation value setting process therefore will be able to search for a pair of compensation values by using the evaluation values at the nine points and the approximately-calculated evaluation values.

Since the above method can reduce the number of times of the trial process that uses the pair of compensation values (i.e. the trial process is performed only nine times for the pairs of compensation values at the nine points), the compensation value setting process does not take much time. Moreover, since the above method calculates the evaluation values of all the pairs of compensation values on the two-dimensional graph, it can find the best pair of compensation values by comparing the evaluation values of all the pairs of compensation values, or the evaluation values of the pairs of compensation values inside a specific area. Furthermore, since the above method calculates the evaluation values of all the pairs of compensation values on the two-dimensional graph, it can make the distance the estimated margin area moves at one time as short as possible within the movement area and have more choices from which to search for the best pair of compensation values; or it can move the estimated margin area in one direction to search for the best pair of compensation values.

Furthermore, in the above-noted embodiment, after calculating the first index values of various pairs of compensation values, the compensation value setting process of the second setting method compares those first index values with the first threshold and picks up all the pairs of compensation values whose first index values are greater than or equal to the first threshold for the setting candidates. However the present invention is not limited to this. After calculating the first index values of various pairs of compensation values, the compensation value setting process may pick up not only the pairs of compensation values whose first index values are greater than or equal to the first threshold, but also the pairs of compensation values within an area surrounded by the setting candidates on the two-dimensional graph.

Furthermore, in the above-noted embodiment, after calculating the first index values of various pairs of compensation values, the compensation value setting process of the second setting method compares those first index values with the first threshold and picks up all the pairs of compensation values whose first index values are greater than or equal to the first threshold for the setting candidates. By using the setting candidates (or the pairs of compensation values it has picked up), the compensation value setting process corrects the lens' position and the spherical aberration on trial basis and calculates the second index values. And the compensation value setting process selects the pair of compensation values of the highest second index value. However the present invention is not limited to this. By using some of the pairs of compensation values, it may correct the lens' position and the spherical aberration on trial basis, calculate both the first and second index values for each pair of compensation values, compare the first index value with the first threshold, recognize all the pairs of compensation values whose first index values are greater than or equal to the first threshold as setting candidates, and then select from among those setting candidates the pair of compensation values whose second index value is the highest of all. In this method, the compensation value setting process does not have to perform the following process: After correcting the lens' position and the spherical aberration on trial basis by using one pair of compensation values for calculating the first index value, it corrects the lens' position and the spherical aberration on trial basis by using the same pair for calculating the second index value. That is, the above method calculates the first and second index values while correcting the lens' position and the spherical aberration on trial basis by using one pair of compensation values only one time. Since that reduces the number of times of the trial process of correcting the lens' position and the spherical aberration, the compensation value setting process does not take much time.

Furthermore, in the above-noted embodiment, after calculating the second index values of various pairs of compensation values, the compensation value setting process of the third setting method compares those second index values with the second threshold and picks up all the pairs of compensation values whose second index values are greater than or equal to the second threshold for the setting candidates. However the present invention is not limited to this. Alternatively, after only calculating the second index values of some the pairs of compensation values which are expected to be around the center of the second area AR2, the compensation value setting process may compare those second index values with the second threshold and pick up all the pairs of compensation values whose second index values are greater than or equal to the second threshold for the setting candidates.

Furthermore, in the above-noted embodiment, after calculating the second index values of various pairs of compensation values, the compensation value setting process of the third setting method compares those second index values with the second threshold and picks up all the pairs of compensation values whose second index values are greater than or equal to the second threshold for the setting candidates. However the present invention is not limited to this. After calculating the second index values of various pairs of compensation values, the compensation value setting process may pick up not only the pairs of compensation values whose second index values are greater than or equal to the second threshold for the setting candidates, but also the pairs of compensation values within an area surrounded by the setting candidates.

Furthermore, in the above-noted embodiment, after calculating the second index values of various pairs of compensation values, the compensation value setting process of the third setting method compares those second index values with the second threshold and picks up all the pairs of compensation values whose second index values are greater than or equal to the second threshold for the setting candidates. By using the setting candidates (or the pairs of compensation values it has picked up), the compensation value setting process corrects the lens' position and the spherical aberration on trial basis and calculates the first index values. And the compensation value setting process selects the pair of compensation values of the highest first index value. However the present invention is not limited to this. By using some of the pairs of compensation values, it may correct the lens' position and the spherical aberration on trial basis, calculate both the first and second index values for each pair of compensation values, compare the second index value with the second threshold, recognize all the pairs of compensation values whose second index values are greater than or equal to the second threshold as setting candidates, and then select from among those setting candidates the pair of compensation values whose first index value is the highest of all. In this method, the compensation value setting process does not have to perform the following process: After correcting the lens' position and the spherical aberration on trial basis by using one pair of compensation values for calculating the second index value, it corrects the lens' position and the spherical aberration on trial basis by using the same pair for calculating the first index value. That is, the above method calculates the first and second index values while correcting the lens' position and the spherical aberration on trial basis by using one pair of compensation values only one time. Since that reduces the number of times of the trial process of correcting the lens' position and the spherical aberration, the compensation value setting process does not take much time.

Furthermore, in the above-noted embodiment, the compensation value setting process calculates the first and second index values of the pair of compensation values such that the larger the first and second index values are, the more positive the evaluation of the pair of compensation values is. And based on the calculated first and second index values, the compensation value setting process sets one pair of compensation values for correcting the lens' position and the spherical aberration. However the present invention is not limited to this. The compensation value setting process may calculate another type of the first and second index values of the pair of compensation values such that: the smaller the first and second index values are, the more positive the evaluation of the pair of compensation values is; or, the larger the first (or second) index value is, the more positive the evaluation of the pair of compensation values is, while, the smaller the second (or first) index value is, the more positive the evaluation of the pair of compensation values is.

Furthermore, in the above-noted embodiment, the above recording and reproducing device 1 (illustrated in FIGS. 1 to 24) is applied as a compensation value setting device. However the present invention is not limited to this. The compensation value setting devices include an information processing device (such as a personal computer that includes an optical disc drive unit for recording or reproducing data from an optical disc, a game device, a vehicle navigation device and a television set), a reproducing device (like the one that reproduces data from an optical disc, such as Digital Versatile Disc and "Blu-ray Disc (Registered Trademark")"), and the like.

Furthermore, in the above-noted embodiment, the above system controller 5 (illustrated in FIGS. 1 to 24) is applied as a changing section that sequentially changes the combination of a spherical aberration compensation value and a lens' position compensation value. However the present invention is not limited to this. The changing section also includes a hardware circuit and the like.

Furthermore, in the above-noted embodiment, the first index value calculator 55 (illustrated in FIGS. 1 to 24) that calculates the first index value from the jitter component of the readout data is applied as a first index value calculation section that calculates, each time the combination of the spherical aberration compensation value and the lens' position compensation value is changed by the changing section and a trial process of correcting the spherical aberration and the position of the objective lens is performed, a first index value representing the evaluation of the combination of the spherical aberration compensation value and the lens' position compensation value for the trial process based on a signal acquired as a result of emitting a laser beam to a data recording surface of an optical disc via an objective lens that collects the laser beam. However the present invention is not limited to this. The first index value calculation section may include a first index value calculator that calculates the first index value from the magnitude of the amplitude of the signal (such as a RF signal, a wobble signal and a tracking error signal) acquired as a result of emitting a laser beam to the data recording surface of an optical disc via an objective lens that collects the laser beam, and other kinds of circuits.

Furthermore, in the above-noted embodiment, the second index value calculator 56 (illustrated in FIGS. 1 to 24) that calculates the second index value from the waveform-equalized data is applied as a second index value calculation section that calculates, each time the combination of the spherical aberration compensation value and the lens' position compensation value is changed by the changing section and a trial process of correcting the spherical aberration and the position of the objective lens is performed, a second index value representing the evaluation of the combination of the spherical aberration compensation value and the lens' position compensation value for the trial process based on data generated after a waveform equalization process for a signal. However the present invention is not limited to this. The second index value calculation section may include: a second index value calculator that calculates the second index value or the PRSNR (Partial Response Signal to Noise Ratio) by using, instead of the trial data, the waveform-equalized data and the demodulated data generated by the Viterbi decoder 54; a second index value calculator that calculates the MLSA (Maximum Likelihood Sequence Amplitude), which is an index representing an error of the PRML; a second index value calculator that calculates a standard deviation as a second index value by calculating the differences of the likelihoods of the path of the reproducing sequence, which corresponds to the recording sequence whose Euclidean distance is smallest as a result of a process of maximum likelihood decoding (which is a part of the PRML process) in which the recording sequence is synchronized with the reproducing sequence, and sorting out the differences; or the like.

Figure 25:
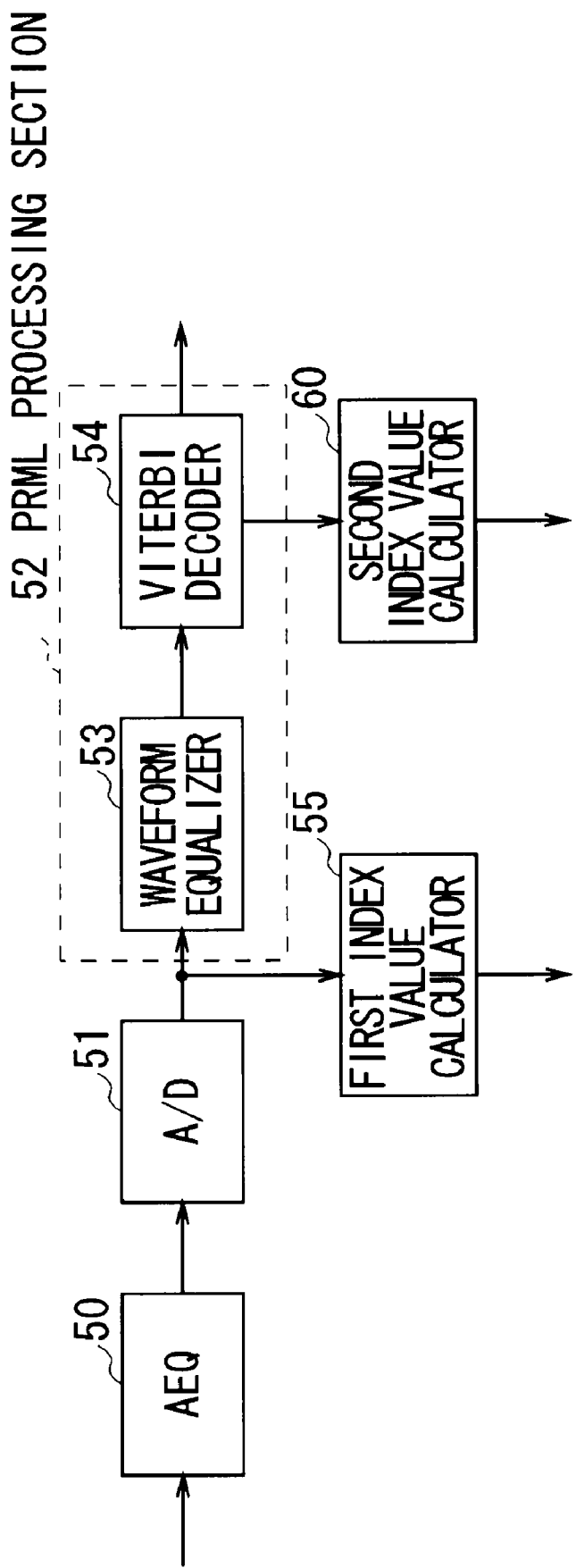
FIG. 25 is a block diagram illustrating the configuration of a reader/writer circuit according to another embodiment of the present invention.

By the way, as shown in FIG. 25 in which the parts have been designated by the same reference numerals and symbols as the corresponding parts of FIG. 5, such a second index value calculator 60 which calculates the second index value from data generated during the process of generating the modulated data by the Viterbi decoder 54 is directly connected to the Viterbi decoder 54.

Furthermore, in the above-noted embodiment, the system controller 5 (illustrated in FIGS. 1 to 24) is applied as a setting section that sets, based on the first and second index values calculated by the first and second index value calculation sections for each combination of a spherical aberration compensation value and a lens' position compensation value, one combination of a spherical aberration compensation value and a lens' position compensation value for correcting the spherical aberration and the position of the objective lens. However the present invention is not limited to this. The setting section includes a hardware circuit and other kinds of circuits.

By the way, in the above-noted embodiment, if the system controller 5 serves as the changing section and the setting section, the system controller 5 executes a compensation value setting program and other programs stored in an internal memory to perform various processes. The compensation value setting program may be installed on the recording and reproducing device 1 from a program storage medium, such as package media (like a flexible disk, CD-ROM (Compact Disc Read Only Memory), DVD) and the semiconductor memories or magnetic discs in which the programs are permanently or temporarily stored. The means for installing the compensation value setting program on the program storage media includes Local Area Network, the Internet, Digital Satellite Broadcasting, and other wired or wireless communication means. It also includes various communication interfaces, such as a router and a modem.

The above-noted method can be applied to a reproducing device, which reproduces data from an optical disc, a recording and reproducing device, which records and reproduces data from an optical disc, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A compensation value setting device comprising:
a changing section that sequentially changes a combination of a spherical aberration compensation value and a lens' position compensation value;
a first index value calculation section that calculates, each time the combination of the spherical aberration compensation value and the lens' position compensation value is changed by the changing section and a trial process of correcting the spherical aberration and the position of the objective lens is performed, a first index value representing the evaluation of the combination of the spherical aberration compensation value and the lens' position compensation value for the trial process based on a signal acquired as a result of emitting the laser beam to the data recording surface of the optical disc via the objective lens that collects the laser beam;
a second index value calculation section that calculates, each time the combination of the spherical aberration compensation value and the lens' position compensation value is changed by the changing section and a trial process of correcting the spherical aberration and the position of the objective lens is performed, a second index value representing the evaluation of the combination of the spherical aberration compensation value and the lens' position compensation value for the trial process based on data generated after a waveform equalization process for the signal; and
a setting section that selects, based on the first and second index values calculated by the first and second index value calculation sections for each combination of the spherical aberration compensation value and the lens' position compensation value, one combination of the spherical aberration compensation value and the lens' position compensation value and then sets the selected combination for correcting the spherical aberration and the position of the objective lens.

2. The compensation value setting device according to claim 1, wherein the setting section calculates an evaluation value for each combination of the spherical aberration compensation value and the lens' position compensation value by performing a predetermined calculation process using as variables the first and second index values calculated for each combination of the spherical aberration compensation value and the lens' position compensation value, selects one combination of the spherical aberration compensation value and the lens' position compensation value based on the calculated evaluation values, and then sets the selected combination for correcting the spherical aberration and the position of the objective lens.

3. The compensation value setting device according to claim 1, wherein the setting section selects, based on the first index values, the combinations of the spherical aberration compensation value and the lens' position compensation value as setting candidates for correcting the spherical aberration and the position of the objective lens, selects, from among the setting candidates, one combination of the spherical aberration compensation value and the lens' position compensation value based on the second index values, and then sets the selected combination for correcting the spherical aberration and the position of the objective lens.

4. The compensation value setting device according to claim 1, wherein the setting section selects, based on the second index values, the combinations of the spherical aberration compensation value and the lens' position compensation value as setting candidates for correcting the spherical aberration and the position of the objective lens, selects, from among the setting candidates, one combination of the spherical aberration compensation value and the lens' position compensation value based on the first index values, and then sets the selected combination for correcting the spherical aberration and the position of the objective lens.

5. The compensation value setting device according to claim 1, wherein the setting section selects one combination of the spherical aberration compensation value and the lens' position compensation value based on the first index values and the other combination of the spherical aberration compensation value and the lens' position compensation value based on the second index values, detects a combination of the spherical aberration compensation value and the lens' position compensation value, which exists at a given position on an imaginary line connecting the one combination to the other combination on a two-dimensional coordinate plane, and then sets the detected combination for correcting the spherical aberration and the position of the objective lens.

6. A compensation value setting method comprising:

an index value calculation step of calculating, each time a combination of the spherical aberration compensation value and a lens' position compensation value is changed and a trial process of correcting a spherical aberration and the position of the objective lens is performed, a first index value based on a signal acquired as a result of emitting the laser beam to the data recording surface of the optical disc via the objective lens that collects the laser beam, and a second index value based on data generated after a waveform equalization process for the signal, the first and second index values representing the evaluation of the combination of the spherical aberration compensation value and the lens' position compensation value for the trial process; and a setting step of selecting, based on the first and second index values calculated for each combination of the spherical aberration compensation value and the lens' position compensation value, one combination of the spherical aberration compensation value and the lens' position compensation value, and setting the selected combination for correcting the spherical aberration and the position of the objective lens.

* * * * *